(12) United States Patent
Sato

(10) Patent No.: US 12,455,059 B2
(45) Date of Patent: Oct. 28, 2025

(54) LIGHT SOURCE UNIT FOR VEHICULAR LIGHTING TOOL AND VEHICULAR LIGHTING TOOL

(71) Applicant: Ichikoh Industries, Ltd., Isehara (JP)

(72) Inventor: Yoshiro Sato, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/723,754

(22) PCT Filed: Dec. 26, 2022

(86) PCT No.: PCT/JP2022/047888
§ 371 (c)(1),
(2) Date: Jun. 24, 2024

(87) PCT Pub. No.: WO2023/127789
PCT Pub. Date: Jul. 6, 2023

(65) Prior Publication Data
US 2025/0109834 A1    Apr. 3, 2025

(30) Foreign Application Priority Data

Dec. 28, 2021 (JP) ................. 2021-215286
Dec. 28, 2021 (JP) ................. 2021-215287
Dec. 28, 2021 (JP) ................. 2021-215288

(51) Int. Cl.
*F21S 43/40* (2018.01)
*F21S 43/16* (2018.01)
(Continued)

(52) U.S. Cl.
CPC ............ *F21S 43/401* (2024.05); *F21S 43/16* (2018.01); *F21S 43/19* (2018.01); *F21S 43/255* (2018.01);
(Continued)

(58) Field of Classification Search
CPC .......... F21S 43/401; F21S 43/16; F21S 43/19; F21S 43/255; F21S 43/26231; F21S 43/31
See application file for complete search history.

(56) References Cited

U.S. PATENT DOCUMENTS

2019/0137063 A1    5/2019   Bechtel et al.
2021/0131638 A1*   5/2021   Sato ................. F21S 43/247

FOREIGN PATENT DOCUMENTS

JP              5-6510 U       1/1993
JP          2005-212755 A      8/2005
(Continued)

OTHER PUBLICATIONS

English Machine Translation of WO 2019 245 030, Sato et al (Year: 2025).*

(Continued)

*Primary Examiner* — Donald L Raleigh
(74) *Attorney, Agent, or Firm* — Oblon, McClelland, Maier & Neustadt, L.L.P.

(57) ABSTRACT

A light source unit for a vehicle lamp includes a light generating portion including a light source that emits excitation light, a light emitting layer constituted of an inorganic material and emitting generated light by irradiation of the excitation light, and a holding member that holds the layer; and a lens member that irradiates the generated light from the layer in a front direction in a vehicle-mounted state. The unit further includes a reflective portion disposed between the layer and the lens member, capable of reflecting a part of light from outside of the lens member, and capable of transmitting the generated light generated in the layer; or a light absorbing portion disposed between the layer and the lens member, and absorbing a part of a wavelength compo- (Continued)

nent among light from outside of the lens member being associated with the generated light.

13 Claims, 22 Drawing Sheets

(51) Int. Cl.
  *F21S 43/19* (2018.01)
  *F21S 43/20* (2018.01)
  *F21S 43/31* (2018.01)
(52) U.S. Cl.
  CPC ......... *F21S 43/26231* (2024.05); *F21S 43/31* (2018.01)

(56) References Cited

FOREIGN PATENT DOCUMENTS

| JP | 2007-87629 A | 4/2007 | |
| JP | 2017-174637 A | 9/2017 | |
| JP | 2018-116780 A | 7/2018 | |
| JP | 2019-519921 A | 7/2019 | |
| JP | 2020-190255 A | 11/2020 | |
| JP | 2021-108237 A | 7/2021 | |
| WO | WO-2019245030 A1 * | 12/2019 | .............. F21S 43/14 |

OTHER PUBLICATIONS

International Search Report issued Mar. 20, 2023 in PCT/JP2022/047888, filed on Dec. 26, 2022, 3 pages.
Japanese Office Action issued Nov. 19, 2024 in Japanese Patent Application No. 2021-215286, (with English translation), 10 pages.
Japanese Office Action issued Nov. 19, 2024 in Japanese Patent Application No. 2021-215287, (with English translation), 8 pages.
Japanese Office Action issued Nov. 19, 2024 in Japanese Patent Application No. 2021-215288, (with English translation), 8 pages.

* cited by examiner

FIG. 8
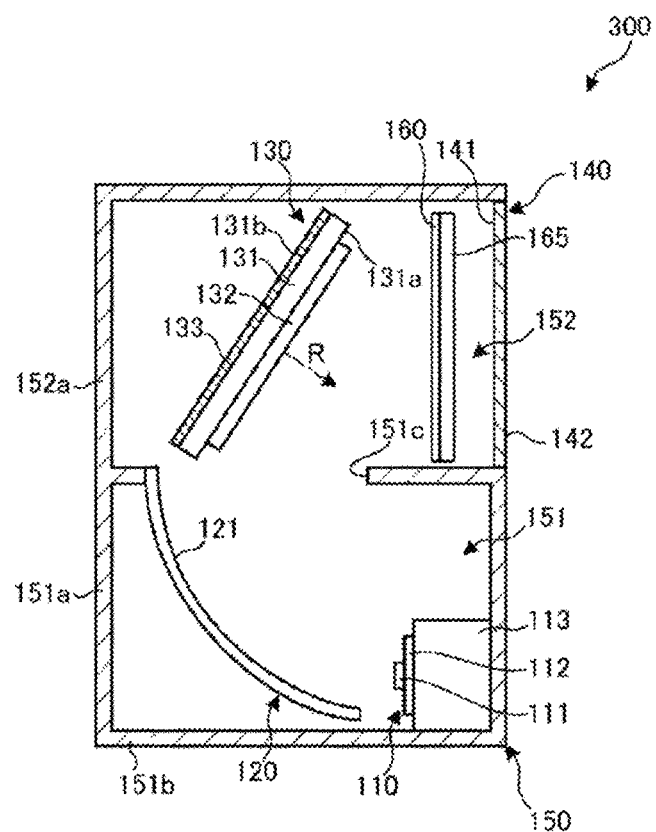
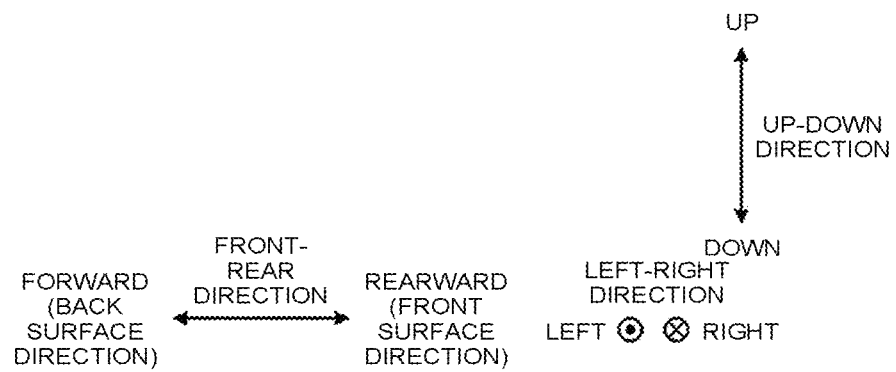

FIG. 15
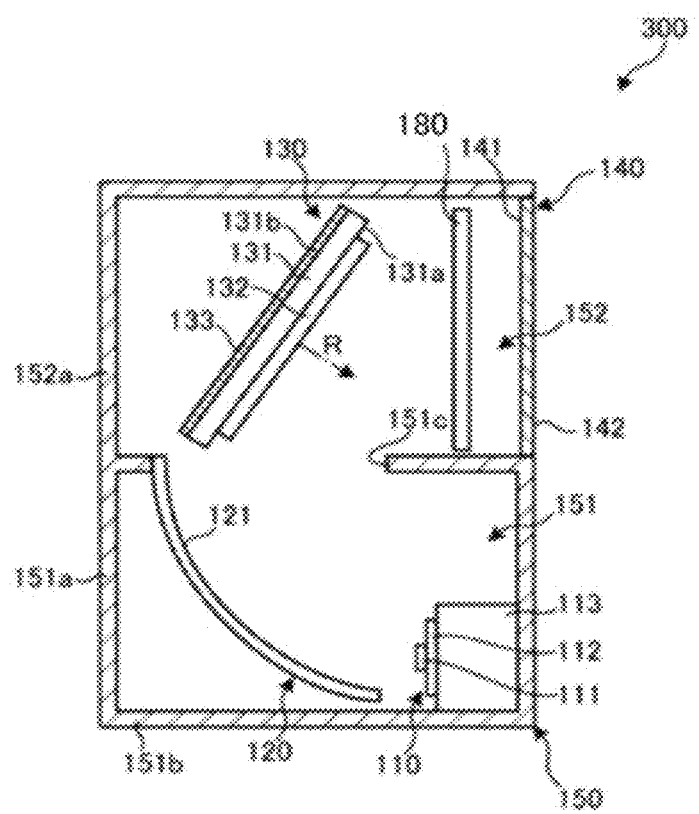
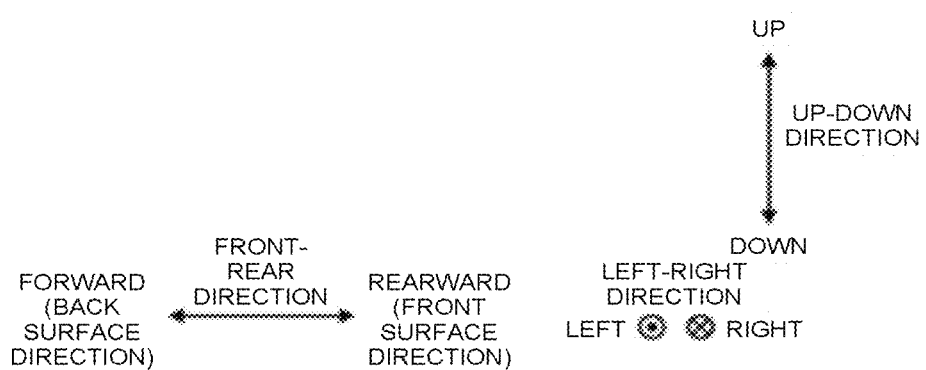

FIG. 19
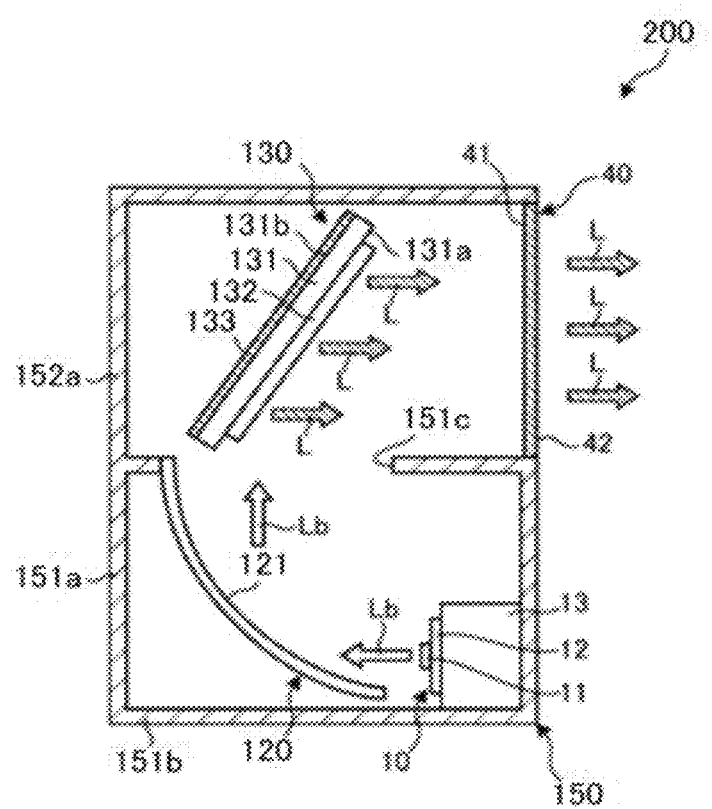
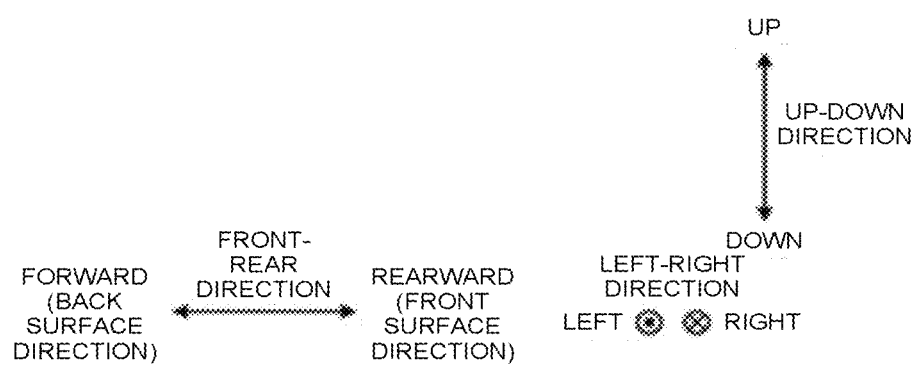

FIG. 21
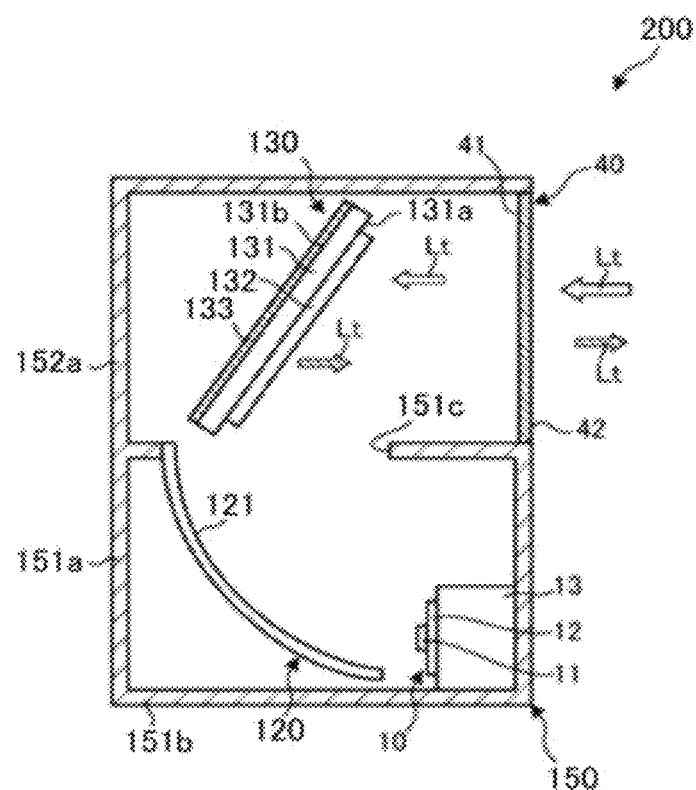
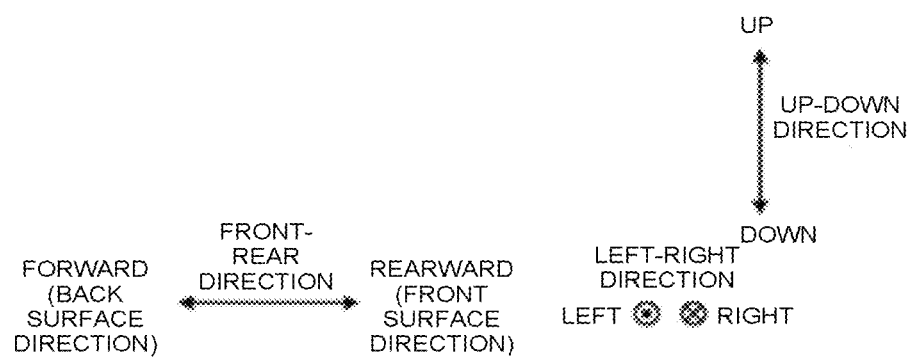

LIGHT SOURCE UNIT FOR VEHICULAR LIGHTING TOOL AND VEHICULAR LIGHTING TOOL

TECHNICAL FIELD

The present invention relates to a light source unit for a vehicle lamp, and a vehicle lamp.

BACKGROUND ART

A light source unit for a vehicle including an excitation light source, a light emitting layer that is constituted of an organic material and emits generated light by irradiating excitation light from the excitation light source, and a lens member that irradiates the excitation light from the light emitting layer is known (e.g., see Patent Literature 1). Further, a vehicle lamp including a light source, a reflector that reflects excitation light from the light source, a light emitting layer that emits generated light by irradiation of the excitation light reflected by the reflector, and a lens member that irradiates the excitation light from the light emitting layer is known (e.g., see Patent Literature 1).

CITATION LIST

Patent Literature

PTL 1: Japanese Unexamined Patent Application Publication No. 2020-190255

SUMMARY OF THE INVENTION

Problems to be Solved by the Invention

In the light source unit, using an inorganic material as the light emitting layer has been proposed. Unlike a film-like organic material, the inorganic material contains colored particles. Therefore, at a time of turning off the light source, external light such as sunlight passes through the lens member, reaches the light emitting layer, and is scattered by the particles. In this case, a light emitting surface appears to be present from outside of the lens member, and improvement may be required in terms of appearance. In addition, in the vehicle lamp as described above, it is required to arrange each part including the light source, the reflector, the light emitting layer, the lens member, and the like in a compact manner.

The present invention has been made in view of the above, and an object of the invention is to provide a light source for a vehicle lamp having a good appearance, a vehicle lamp, and a vehicle lamp capable of arranging each part in a compact manner.

Means for Solving the Problem

A light source unit for a vehicle lamp according to the present invention includes: a light generating portion including a light source that emits excitation light, a light emitting layer that is constituted by using an inorganic material, and emits generated light by irradiation of the excitation light, and a holding member that holds the light emitting layer; a lens member that irradiates the generated light from the light emitting layer in a front direction in a vehicle-mounted state; and a reflective portion that is disposed between the light emitting layer and the lens member, is capable of reflecting a part of light from outside of the lens member, and is capable of transmitting the generated light generated in the light emitting layer. Further, a light source unit for a vehicle lamp according to the present invention includes: a light generating portion including a light source that emits excitation light, a light emitting layer that is constituted by using an inorganic material, and emits generated light by irradiation of the excitation light, and a holding member that holds the light emitting layer; a lens member that irradiates the generated light from the light emitting layer in a front direction in a vehicle-mounted state; and a light absorbing portion that is disposed between the light emitting layer and the lens member, and absorbs a part of a wavelength component among light from outside of the lens member being associated with the generated light. Further, a vehicle lamp according to the present invention includes: a light source that emits excitation light; a reflector that reflects the excitation light from the light source; a light generating portion including a light emitting layer that emits generated light by irradiation of the excitation light, and a holding member that holds the light emitting layer; and a lens member that is disposed on a front side with respect to the light emitting layer, and irradiates the generated light from the light emitting layer in a front direction in a vehicle-mounted state.

In the light source unit for a vehicle lamp, the reflective portion may be formed by using a metal vapor deposition film.

In the light source unit for a vehicle lamp, the excitation light may be blue, and the generated light and the lens member may be red.

In the light source unit for a vehicle lamp, the reflective portion may be formed in such a way as to cover the light emitting layer.

In the light source unit for a vehicle lamp, the light absorbing portion may be a blue filter.

In the light source unit for a vehicle lamp, the light absorbing portion may be provided separately from the light generating portion and the lens member.

In the light source unit for a vehicle lamp, the light absorbing portion may be formed on the lens member.

In the light source unit for a vehicle lamp, the light absorbing portion is formed in such a way that the light emitting layer is not visually recognized, when inside of the light source unit is viewed from outside of the lens member at a time of turning off the light source.

In the light source unit for a vehicle lamp, the holding member may be capable of transmitting the generated light, the light generating portion may be formed on a first surface of the holding member, and the reflective portion may be formed on a second surface opposite to the first surface of the holding member.

The light source unit for a vehicle lamp may further include a transmissive member that transmits the generated light generated by the light generating portion, between the light emitting layer and the lens member, and the reflective portion may be formed on the transmissive member.

In the light source unit for a vehicle lamp, the reflective portion may be formed on the lens member.

In the light source unit for a vehicle lamp, the reflective portion may be formed in such a way as to be visually recognized as a shape of a mirror surface, when inside of the light source unit is viewed from outside of the lens member.

A vehicle lamp according to the present invention includes the above-described light source unit for a vehicle lamp.

In the vehicle lamp, the light generating portion may be disposed in such a way that a normal direction of the light emitting layer is inclined obliquely downward with respect to a front direction.

In the vehicle lamp, the excitation light may be blue, and the generated light and the lens member may be red.

In the vehicle lamp, a plurality of the light generating portions may be arranged in a left-right direction in a vehicle-mounted state.

The vehicle lamp may further include a housing that supports the light source, the reflector, the light generating portion, and the lens member. The housing may be disposed in such a way as to cover the reflector when viewed from a front side, and may define a lamp chamber between the lens member and itself. The light generating portion may be disposed inside the lamp chamber.

In the vehicle lamp, the holding member may be formed into a plate-like shape, may be capable of transmitting the excitation light and the generated light, and may include a light reflective member that reflects the excitation light and the generated light on a second surface opposite to a first surface on which the light emitting layer is held.

In the vehicle lamp, the light reflective member may include a cover portion that covers the second surface, and a bulging portion bulging upward from the second surface. The bulging portion may be bent toward a front side, and protrude in a front direction with respect to the light emitting layer.

In the vehicle lamp, the holding member may have a plate-like shape, and include a light reflective surface that reflects the excitation light and the generated light. The light emitting layer may be formed on the light reflective surface. The holding member may include a protruding portion bulging upward of the light emitting layer, and protruding toward a front side of the light emitting layer.

Effect of the Invention

According to the present invention, it is possible to provide a light source unit for a vehicle lamp having a good appearance, and a vehicle lamp. Further, it is possible to provide a vehicle lamp capable of arranging each part in a compact manner.

BRIEF DESCRIPTION OF THE DRAWINGS

FIG. 8 is a side cross-sectional view illustrating another example of the vehicle lamp.

FIG. 15 is a side cross-sectional view illustrating another example of the vehicle lamp.

FIG. 19 is a diagram illustrating another example of an operation of the vehicle lamp.

FIG. 21 is a diagram illustrating another example of an operation of the vehicle lamp.

MODE FOR CARRYING OUT THE INVENTION

In the following, an embodiment of a light source unit for a vehicle lamp, and a vehicle lamp according to the present invention is described with reference to the drawings. Note that, the present invention is not limited to this embodiment. In addition, constituent elements in the following embodiment include those that can be easily replaced by those skilled in the art, or those that are substantially the same. In the following description, each of a front-rear direction, an up-down direction, and a left-right direction is a direction in a vehicle-mounted state in which a light source unit for a vehicle lamp is mounted on a vehicle, and indicates a direction when a traveling direction of the vehicle is viewed from a driver's seat. Note that, in the present embodiment, it is assumed that the up-down direction is in parallel to a vertical direction, and the left-right direction is a horizontal direction. Further, regarding a front direction and a back surface direction, it is assumed that a direction in which light is emitted from a light source unit for a vehicle lamp or from a vehicle lamp is the front direction, and a direction opposite to the front direction is the back surface direction.

Figure 1:
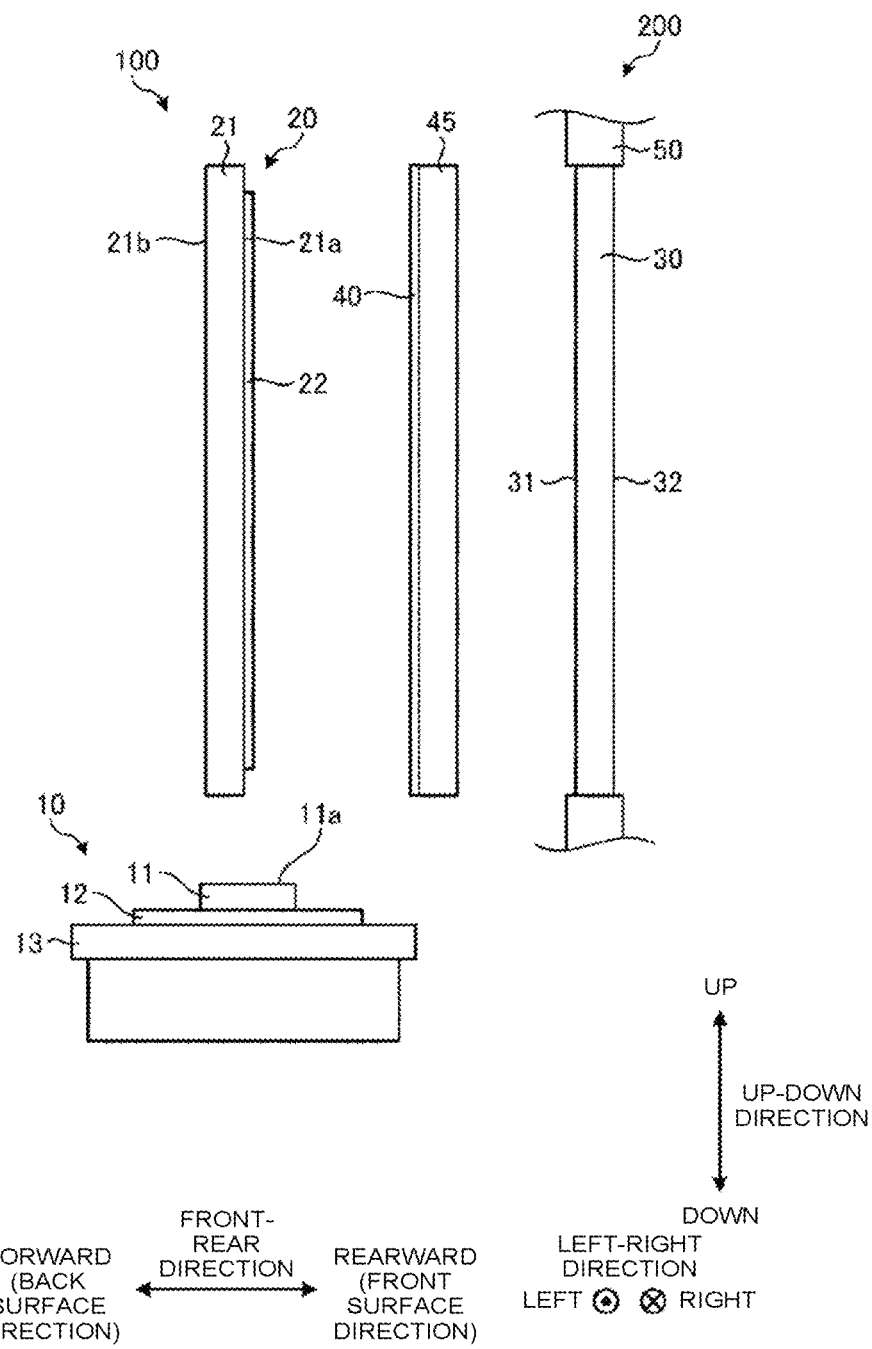
FIG. 1 is a side view illustrating an example of a vehicle lamp according to the present embodiment.

FIG. 1 is a side view illustrating an example of a vehicle lamp 200 according to the present embodiment. The vehicle lamp 200 illustrated in FIG. 1 is, for example, a signal lamp such as a tail lamp. Therefore, in the present embodiment, the front direction is a rear direction (rearward), and the back surface direction is a front direction (forward). As illustrated in FIG. 1, the vehicle lamp 200 includes a light source unit 100.

The light source unit 100 includes a light source portion 10, a light generating portion 20, a lens member 30, and a reflective portion 40.

The light source portion 10 includes a light source 11, a support substrate 12, and a heat sink 13. The light source 11 is a light source such as an LED or an organic EL, for example. The light source 11 is disposed below the light generating portion 20, for example, and a light emitting surface 11*a* faces toward the light generating portion 20 (upward). The light source 11 emits blue light from the light emitting surface 11*a*, as excitation light, for example. Note that, the light source 11 is not limited to a light source that emits blue light, and it is possible to use a light source capable of irradiating light (such as purple light, or ultraviolet light) of a short wavelength, as compared with a wavelength of generated light generated in the light generating portion 20 to be described later.

The support substrate 12 supports the light source 11. The support substrate 12 is supported by the heat sink 13. The heat sink 13 is held by an unillustrated bracket or the like, for example.

The light generating portion 20 includes a holding member 21 and a light emitting layer 22. The holding member 21 is supported by an unillustrated bracket or the like independently of the light source portion 10. Since the holding member 21 is provided independently of the light source portion 10, the degree of freedom of the layout of the light source portion 10 and the light generating portion 20 is enhanced. Therefore, it is possible to flexibly set the arrangement of the light source portion 10 and the light generating portion 20 according to a design content.

The holding member 21 is made of aluminum. Generated light from the light emitting layer 22 is reflected rearward, and a front luminance of the lamp can be enhanced. In the present embodiment, the holding member 21 is made of aluminum, but may be made of glass or sapphire. Alternatively, the light emitting layer 22 may be formed on the holding member 21 made of glass or sapphire, and the holding member 21 may be bonded to a reflective member made of aluminum or the like.

The light emitting layer 22 is held on the holding member 21. The light emitting layer 22 emits generated light by exciting excitation light from the light source 11 by irradiation. The light emitting layer 22 is held on a planar portion 21*a* of the holding member 21, for example. The light emitting layer 22 is formed into a shape associated with a shape of a tail lamp in a front view, or the like, for example. In the present embodiment, as the light emitting layer 22, for example, an inorganic material such as CaAlSiN3:Eu (CASN), (Sr, Ca)AlSiN3:Eu (SCASN), or the like is used.

The lens member 30 is disposed in the front direction with respect to the light generating portion 20. The lens member 30 includes an incident surface 31, and an exit surface 32. Red light, which is generated light from the light generating portion 20 is incident on the incident surface 31. The exit surface 32 outputs light incident on the incident surface 31 in the front direction. The lens member 30 transmits red light, and absorbs light different from red light. Therefore, an excitation light component included in external light is absorbed by the lens member 30. The lens member 30 is held by an inner panel 50 or the like, for example.

The reflective portion 40 is disposed between the light emitting layer 22 and the lens member 30. The reflective portion 40 is capable of reflecting a part of external light from the lens member 30. The reflective portion 40 is capable of transmitting generated light generated by the light emitting layer 22. The reflective portion 40 is formed by using a metal vapor deposition film made of aluminum, silver or the like, for example. The reflective portion 40 is capable of reflecting light among light that reaches the reflective portion 40 with a reflectance of 10% or more but less than 100%, for example.

The reflective portion 40 can be formed on a transmissive member 45 disposed between the light emitting layer 22 and the lens member 30, for example. As the transmissive member 45, glass substrate or the like capable of transmitting generated light generated by the light generating portion 20. Forming the reflective portion 40 on the transmissive member 45 enables to securely hold the reflective portion 40.

Figure 2:
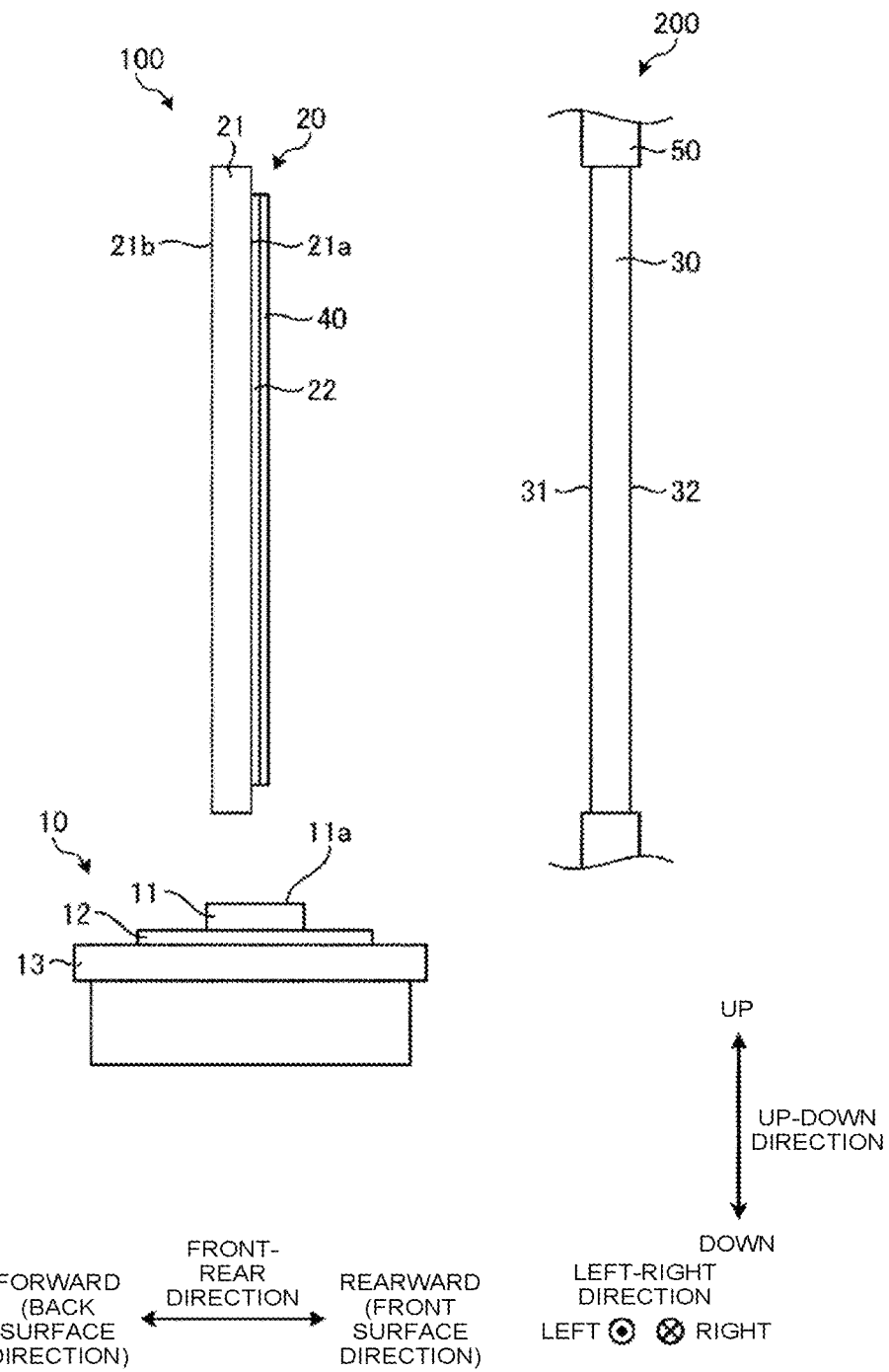
FIG. 2 is a diagram illustrating another example of an arrangement of a reflective portion.
Figure 3:
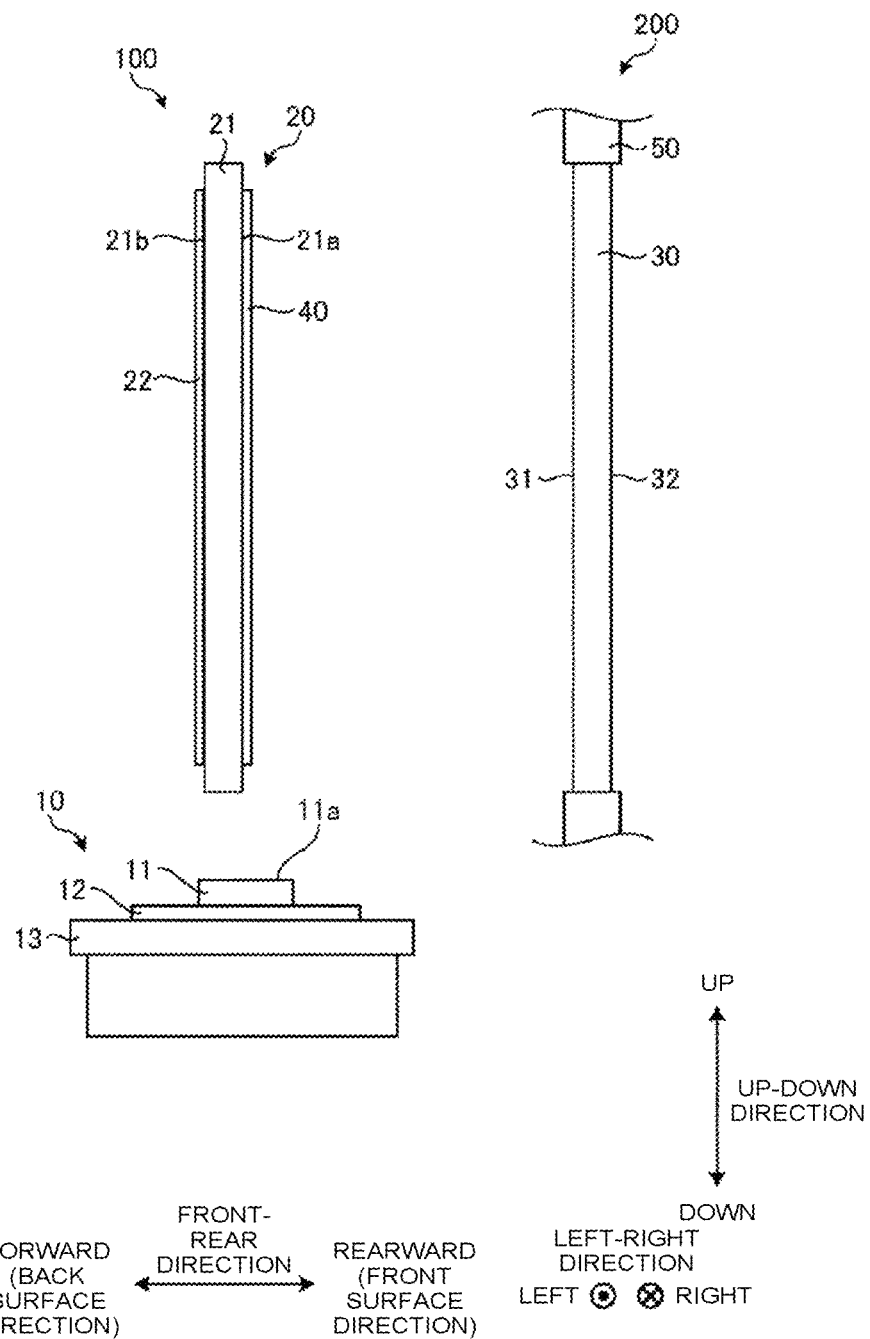
FIG. 3 is a diagram illustrating another example of an arrangement of the reflective portion.
Figure 4:
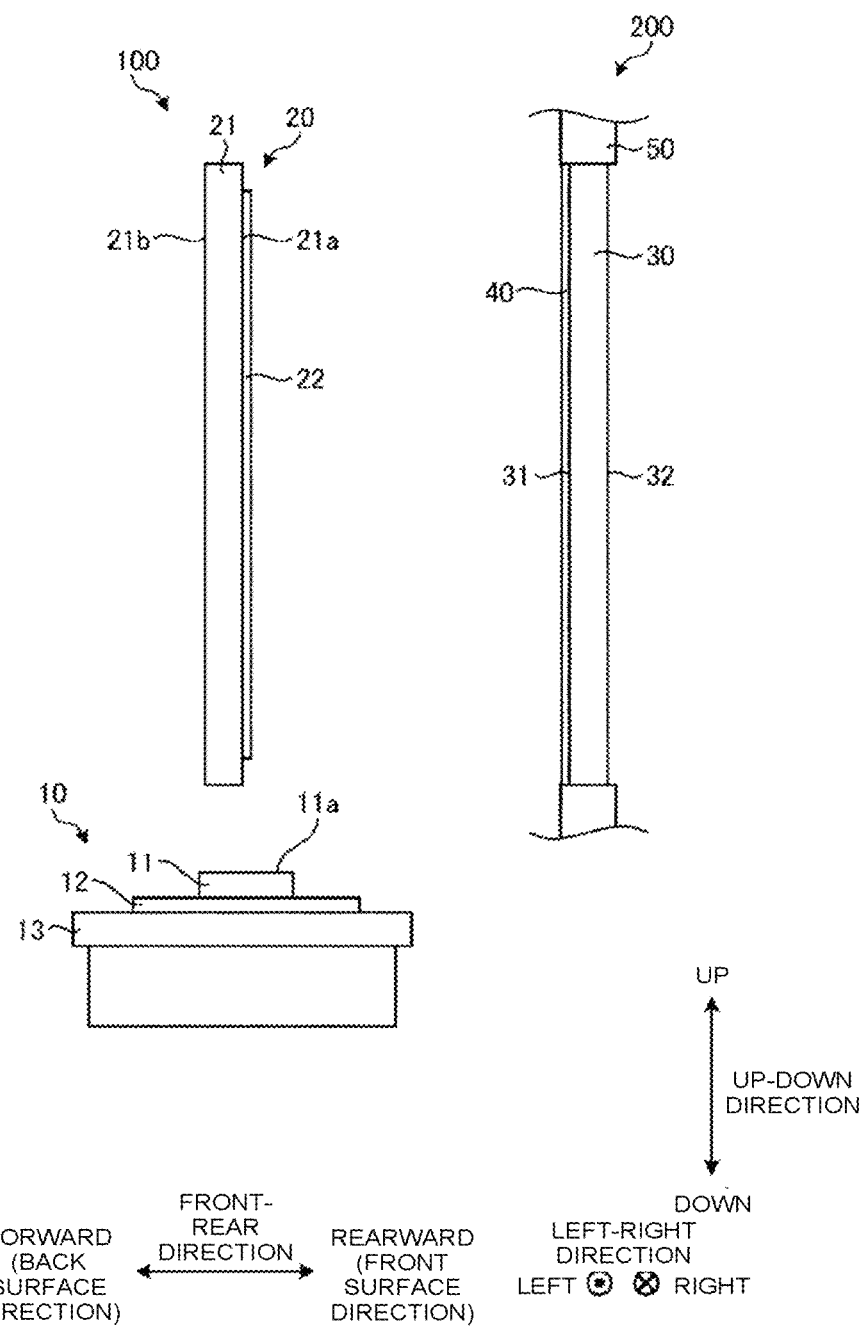
FIG. 4 is a diagram illustrating another example of an arrangement of the reflective portion.

FIGS. 2 to 4 are diagrams illustrating another example of an arrangement of the reflective portion 40. As illustrated in FIG. 2, the reflective portion 40 can be formed in such a way as to cover the light emitting layer 22, for example. In this case, the reflective portion 40 can be formed by vapor deposition or the like on the light emitting layer 22, after the light emitting layer 22 is formed. Forming the reflective portion 40 in such a way as to cover the light emitting layer 22 enables to integrally handle the light generating portion 20 and the reflective portion 40.

As illustrated in FIG. 3, it is possible to configure in such a way that the light emitting layer 22 is formed on a planar portion (first surface) 21*b* of the holding member 21, and the reflective portion 40 is formed on a planar portion (second surface) 21*a* of the holding member 21, for example. In this case, after the light emitting layer 22 is formed, or before the light emitting layer 22 is formed, the reflective portion 40 can be formed by vapor deposition or the like on the planar portion 21*a*. Forming the reflective portion 40 on the planar portion 21*a* of the holding member 21 enables to integrally handle the light generating portion 20 and the reflective portion 40.

As illustrated in FIG. 4, the reflective portion 40 can be formed on the incident surface 31 of the lens member 30. Forming the reflective portion 40 on the incident surface 31 of the lens member 30 enables to integrally handle the reflective portion 40 and the lens member 30.

Figure 5:
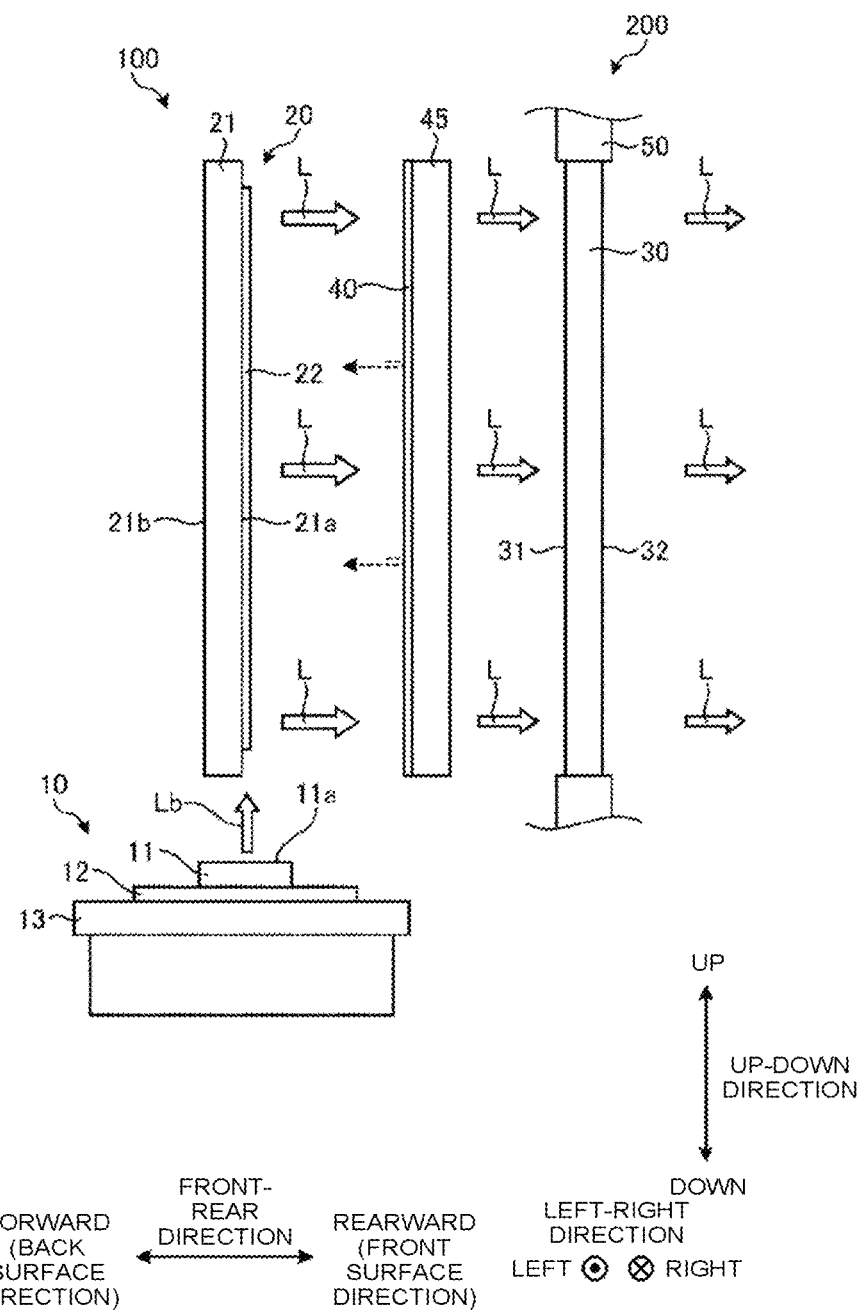
FIG. 5 is a diagram illustrating an example of an operation of the vehicle lamp.
Figure 6:
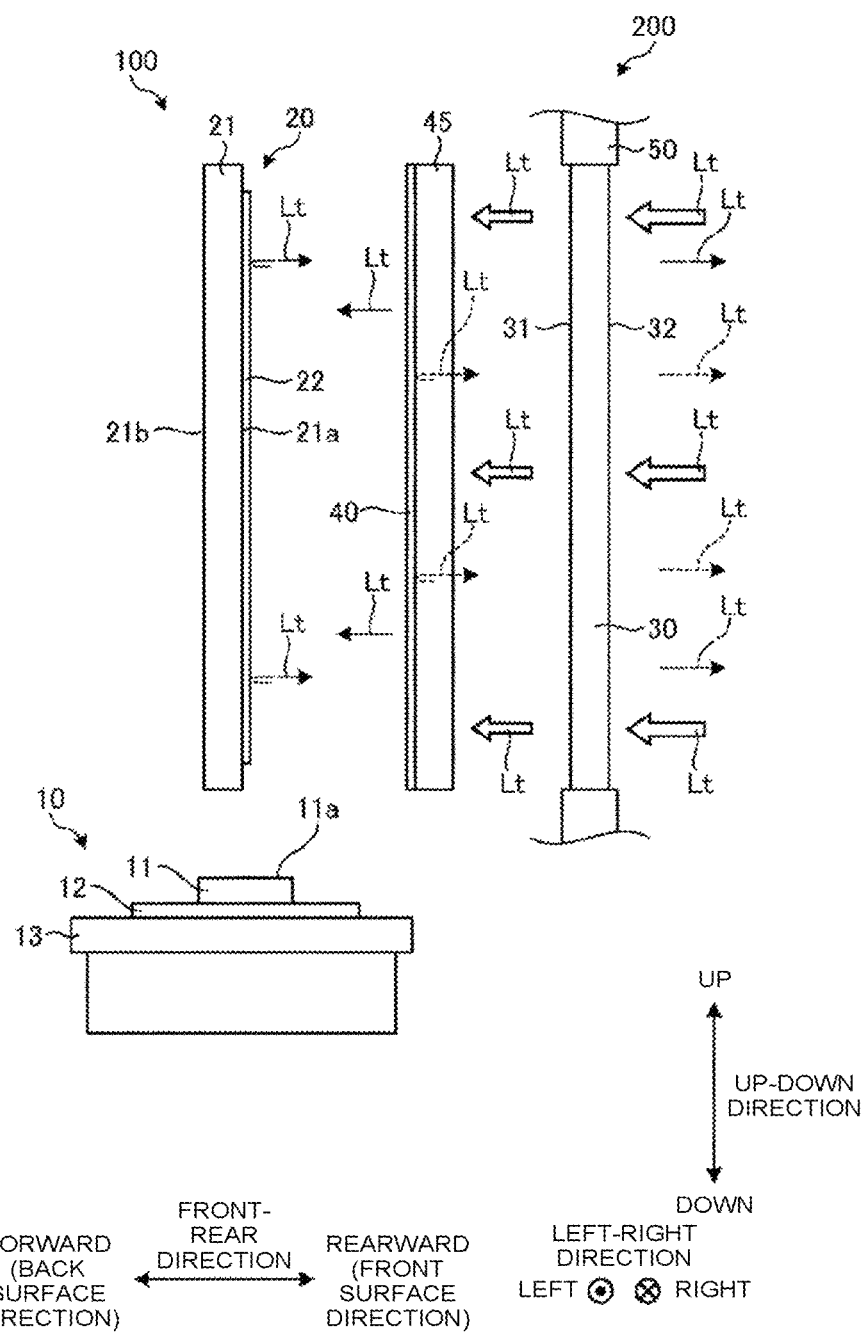
FIG. 6 is a diagram illustrating an example of an operation of the vehicle lamp.

Next, an operation of the vehicle lamp 200 configured as described above is described. FIGS. 5 and 6 are diagrams illustrating an example of an operation of the vehicle lamp 200. FIGS. 5 and 6 illustrate, as a configuration of the light source unit 100, a case of the configuration illustrated in FIG. 1, but similar description is also available for a configuration illustrated from FIGS. 2 to 4. As illustrated in FIG. 5, by turning on the light source 11, a part of excitation light Lb to be output from the light emitting surface 11*a* is irradiated to the light emitting layer 22 directly or by transmitting through the holding member 21.

When the light emitting layer 22 is irradiated with the excitation light Lb, the light emitting layer 22 is excited, and emits red light L. A part of the red light L generated in the light emitting layer 22 is output rearward (in the front direction). Further, when a reflective layer is formed on the planar portion 21*b* of the holding member 21, a part of the red light L generated in the light emitting layer 22 is output forward (in the back surface direction), reflected by the reflective layer, and travels rearward. Therefore, the red light L generated in the light emitting layer 22 is output in the front direction, as planar light. A part of the red light L is reflected by the reflective portion 40, and a part of the red light L is transmitted and incident on the incident surface 31 of the lens member 30. The red light L incident on the incident surface 31 is output in the front direction from the exit surface 32 of the lens member 30, and irradiated as a pattern of a tail lamp, for example.

Further, when the light source 11 is turned off, as illustrated in FIG. 6, since the excitation light Lb is not emitted from the light source 11, the red light L is not generated from the light emitting layer 22. In the present embodiment, the light emitting layer 22 is made of an inorganic material, and contains colored particles in a state that the excitation light Lb is not irradiated. Meanwhile, in the present embodiment, the reflective portion 40 is disposed between the light emitting layer 22 and the lens member 30.

In this configuration, when light outside of the lens member 30 (hereinafter, referred to as external light Lt) enters the lens member 30, light on a short wavelength side with respect to the wavelength of red light, which is the color of the lens member 30, is absorbed by the lens member 30. When the external light Lt reaches the reflective portion 40, a part of the external light Lt is reflected and output rearward from the lens member 30. Therefore, when inside of the vehicle lamp 200 is viewed from outside of the lens member 30, it is possible to form an appearance in which inside of the vehicle lamp 200 is visually recognized as a shape of a mirror surface, that is, an appearance as if a mirror surface is present inside the vehicle lamp 200.

Further, a part of the external light Lt passes through the transmissive member 45 and the reflective portion 40, and reaches the light generating portion 20. The external light Lt that has reached the light generating portion 20 is scattered by particles of an inorganic material contained in the light emitting layer 22, the scattered light travels rearward, a part of the scattered light is reflected by the reflective portion 40, and a part of the scattered light is transmitted and output rearward from the lens member 30, for example. The amount of the external light Lt to be output from the lens member 30 is reduced, as compared with a time when the external light Lt is incident on the lens member 30 from the outside. Therefore, it is possible to form an appearance in which the external light Lt scattered by the light emitting layer 22 cannot be seen from the outside and only a mirror surface can be seen, or an appearance as if the light emitting layer 22 slightly stands out from the mirror surface.

As described above, the light source unit 100 according to the present embodiment includes the light generating portion 20 including the light source 11 that emits excitation light, the light emitting layer 22 that is constituted by using an inorganic material, and emits generated light by irradiation of the excitation light, and the holding member 21 that holds the light emitting layer 22; the lens member 30 that irradiates the generated light from the light emitting layer 22 in the front direction in a vehicle-mounted state; and the reflective portion 40 that is disposed between the light emitting layer 22 and the lens member 30, is capable of reflecting a part of light from outside of the lens member 20, and is capable of transmitting the generated light generated in the light emitting layer 22.

According to this configuration, when light from outside of the lens member 30 enters the lens member 30, a part of the light is reflected and output rearward from the lens member 30. Therefore, when the vehicle lamp 200 is viewed from outside of the lens member 30, it appears as if a mirror surface is present inside the vehicle lamp 200. This enables to provide the light source unit 100 having a good appearance.

In the light source unit 100 for a vehicle lamp according to the present embodiment, the reflective portion 40 is formed by using a metal vapor deposition film. According to this configuration, it is easy to achieve a configuration in which a part of light from outside of the lens member 30 is reflectable, and generated light generated in the light emitting layer 22 is transmissible.

In the light source unit 100 for a vehicle lamp according to the present embodiment, excitation light is blue, and generated light and the lens member 30 are red. According to this configuration, excitation light scattered or the like without being absorbed by the light emitting layer 22 can be absorbed by the lens member 30. Therefore, it is possible to suppress the excitation light from leaking to outside of the vehicle lamp 200.

In the light source unit 100 for a vehicle lamp according to the present embodiment, the reflective portion 40 may be formed in such a way as to cover the light emitting layer 22. According to this configuration, it is possible to form an appearance as if a mirror surface is present at a position associated with the light emitting layer 22.

In the light source unit 100 for a vehicle lamp according to the present embodiment, the holding member 21 may be made of aluminum, the light generating portion 20 may be formed on the first surface of the holding member 21, and the reflective portion 40 may be formed on the second surface opposite to the first surface of the holding member 21. According to this configuration, it is possible to form an appearance as if the light emitting layer 22 is present deep inside a mirror surface.

The light source unit 100 for a vehicle lamp according to the present embodiment may further include the transmissive member 45 that transmits generated light generated in the light generating portion 20, between the light emitting layer 22 and the lens member 30, and the reflective portion 40 may be provided on the transmissive member 45. According to this configuration, it is possible to form an appearance as if the light emitting layer 22 is present further deep inside the mirror surface.

In the light source unit 100 for a vehicle lamp according to the present embodiment, the reflective portion 40 may be formed on the lens member 30. According to this configuration, it is possible to integrally handle the reflective portion 40 and the lens member 30.

In the light source unit 100 for a vehicle lamp according to the present embodiment, the reflective portion 40 is formed in such a way as to be visually recognized as a shape of a mirror surface, when inside of the light source unit 100 is viewed from outside of the lens member 30. This enables to provide the light source unit 100 having a good appearance.

The vehicle lamp 200 according to the present invention includes the above-described light source unit 100. According to this configuration, it is possible to provide a vehicle lamp having a good appearance.

Figure 7:
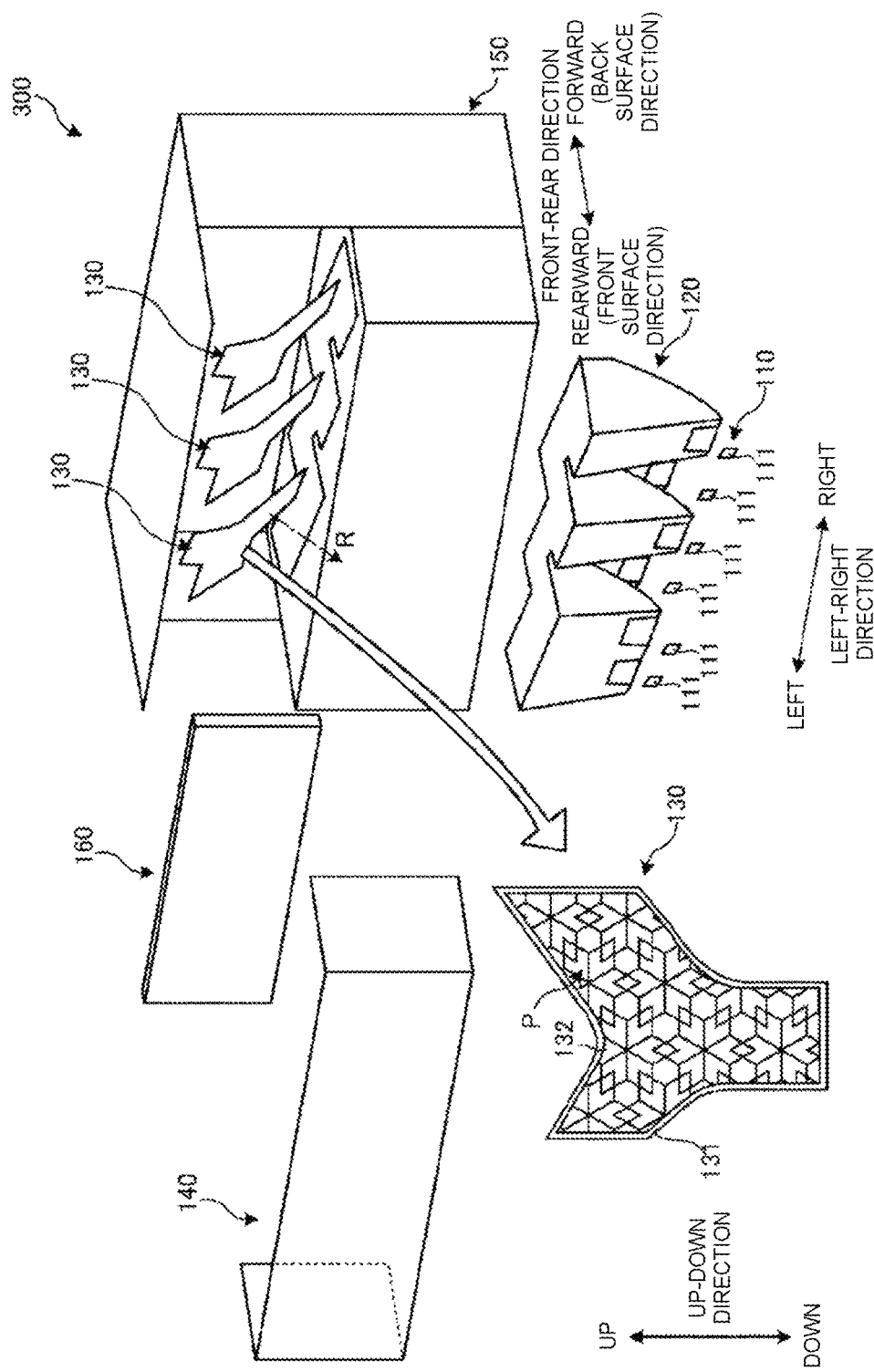
FIG. 7 is an exploded perspective view illustrating another example of a vehicle lamp according to another embodiment.

FIG. 7 is an exploded perspective view illustrating an example of a vehicle lamp 300 according to another embodiment. FIG. 8 is a side cross-sectional view illustrating an example of the vehicle lamp 300. The vehicle lamp 300 illustrated in FIGS. 7 and 8 is, for example, a signal lamp such as a tail lamp. Therefore, in the present embodiment, the front direction is a rear direction (rearward), and the back surface direction is a front direction (forward). The vehicle lamp 300 includes a light source portion 110, a reflector 120, a light generating portion 130, a lens member 140, a housing 150, and a reflective portion 160.

The light source portion 110 includes a light source 111, a support substrate 112, and a heat sink 113. The light source 111 is a light source such as an LED or an organic EL, for example. The light source 111 is disposed below the light generating portion 130, for example, and a light emitting surface 111a faces toward the back surface direction (forward). The light source 111 emits blue light from the light emitting surface 111a, as excitation light, for example. Note that, the light source 111 is not limited to a light source that emits blue light, and it is possible to use a light source capable of irradiating light (such as purple light, or ultraviolet light) of a short wavelength, as compared with a wavelength of generated light generated in the light generating portion 130 to be described later. The light source 111 is provided by the number corresponding to the number of the light generating portions 130 to be described later.

The support substrate 112 supports the light source 111. The support substrate 112 is supported by the housing 150.

The reflector 120 is disposed on the back side with respect to the light source 111. The reflector 120 includes a reflective surface 121 that reflects excitation light to be emitted from the light source 111 upward. The reflective surface 121 is provided for each of the light generating portions 130 to be described later. Note that, the reflective surface 121 may be disposed as necessary irrespective of the number and the location of the light generating portions 130. The reflector 120 is disposed inside the housing 150. The reflector 120 is disposed in such a way as to hide on the back side of the housing 150 so as not to be directly seen, when the vehicle lamp 300 is viewed from the front side.

The light generating portion 130 includes a holding member 131 and a light emitting layer 132. The light generating portion 130 is disposed in such a way that the normal direction R of the light emitting layer 132 is inclined obliquely downward with respect to the front direction. In addition, the light generating portion 130 is disposed in such a way that the normal direction R of the light emitting layer 132 faces the vehicle outer side (left side) with respect to the front direction. A plurality of the light generating portions 130 are disposed in the left-right direction.

The holding member 131 is made of glass or sapphire. A light emitting layer is formed on the holding member 131, and the holding member 131 is bonded to a reflective member made of aluminum or the like. Further, the light emitting layer may be formed on a reflective member made of aluminum or the like.

The light emitting layer 132 is held on a first surface 131a of the holding member 131. The light emitting layer 132 emits generated light by exciting excitation light from the light source 111 by irradiation. The light emitting layer 132 is held on the first surface 131a of the holding member 131, for example. The light emitting layer 132 is formed into a shape associated with a shape of a tail lamp in a front view, or the like, for example. For example, as illustrated in FIG. 7, the light emitting layer 132 may include a predetermined pattern P.

In the present embodiment, an inorganic material such as CaAlSiN3:Eu (CASN) is used as the light emitting layer 132. In this case, the light emitting layer 132 can be formed by applying, on the holding member 131, a mixed material of a transparent resin such as silicone, and CASN, and baking. Further, the light emitting layer 132 can be formed by applying, on the holding member 131, a mixed material of an inorganic material such as low melting point glass, and CASN, and baking.

When an inorganic material is used as the light emitting layer 132, for example, a substrate made of glass or the like can be used as the holding member 131. Further, other types of materials such as (Sr, Ca)AlSiN3:Eu (SCASN) may be used as the light emitting layer 132.

The lens member 140 is disposed in the front direction with respect to the light generating portion 130. The lens member 140 includes an incident surface 141 and an exit surface 142. Red light, which is generated light from the light generating portion 130, is incident on the incident surface 141. The exit surface 142 outputs light incident on the incidence surface 141 in the front direction. The lens member 140 transmits red light, and absorbs light different from red light. Therefore, an excitation light component included in external light is absorbed by the lens member 140. The lens member 140 is held by the housing 150 or the like, for example.

The housing 150 is formed by using a resin material of a black color or the like, for example. The housing 150 has a rectangular box shape, for example. The housing 150 supports or accommodates the light source portion 110, the reflector 120, the light generating portion 130, and the lens member 140. The housing 150 includes an accommodation portion 151 and a lamp chamber 152.

The accommodation portion 151 and the lamp chamber 152 are formed in two stages in the up-down direction. The lamp chamber 152 is arranged on the upper stage side, and the accommodation portion 151 is arranged on the lower stage side. The accommodation portion 151 accommodates the light source portion 110 and the reflector 120. The accommodation portion 151 is surrounded by a lower wall portion 151a in the front-rear direction and the left-right direction. The lower wall portion 151a is disposed in such a way as to cover the reflector 120, when the vehicle lamp 300 is viewed from the front side. The accommodation portion 151 has a bottom portion 151b at a lower portion thereof. The accommodation portion 151 has an opening portion 151c in an upper portion thereof. The opening portion 151c has a shape associated with the shape of an upper portion of the reflector 120. The lamp chamber 152 is provided in a space surrounded by an upper wall portion 152a and the lens member 140. The light generating portion 130 is disposed in the lamp chamber 152.

The reflective portion 160 is disposed between the light emitting layer 132 and the lens member 140. The reflective portion 160 can reflect a part of light from outside of the lens member 140. The reflective portion 160 can be formed on a transmissive member 165 disposed between the light emitting layer 132 and the lens member 140, for example.

Figure 9:
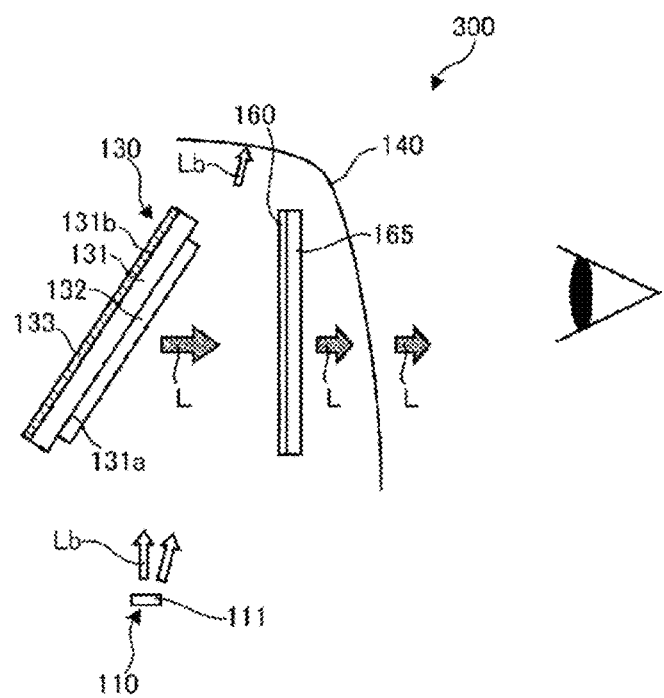
FIG. 9 is a diagram illustrating another example of an operation of the vehicle lamp.

FIG. 9 is a diagram schematically illustrating another example of an operation of the vehicle lamp 300. In FIG. 9, illustration of a configuration of the reflector 120, the housing 150, and the like is omitted. As illustrated in FIG. 9, when the light emitting layer 132 is irradiated with excitation light Lb, the light emitting layer 132 is excited, and emits red light L. A part of the red light L generated in the light emitting layer 132 is output rearward (in the front direction). Further, a part of the red light L generated in the light emitting layer 132 is output forward (in the back surface direction) by the holding member 131, reflected by a reflective layer, and travels rearward. Therefore, the red light L generated in the light emitting layer 132 is output in the front direction, as planar light. A part of the red light L is reflected on the reflective portion 160, and a part of the red light L is transmitted and reaches the lens member 140, output from the lens member 140 in the front direction, and irradiated as a pattern of a tail lamp, for example. Further, a part of the excitation light Lb, which is blue, is absorbed by the lens member 140, which is red.

Figure 10:
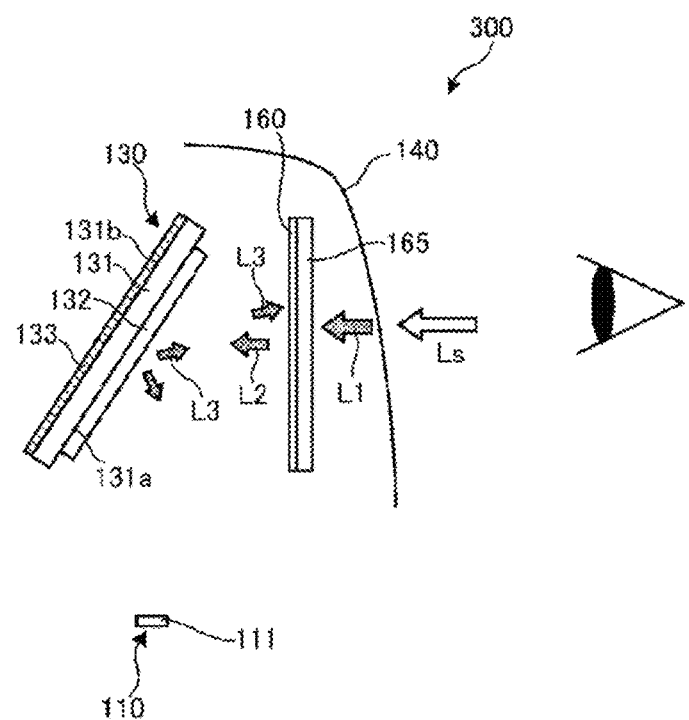
FIG. 10 is a diagram illustrating another example of an operation of the vehicle lamp.

FIG. 10 is a diagram schematically illustrating another example of an operation of the vehicle lamp 300. In FIG. 10, illustration of a configuration of the reflector 120, the housing 150, and the like is omitted. As illustrated in FIG. 10, when the light source 111 is turned off, since excitation light is not emitted from the light source 111, red light is not generated from the light emitting layer 132. In the present embodiment, the light emitting layer 132 is made of an inorganic material, and contains colored particles in a state that excitation light is not irradiated. Meanwhile, in the present embodiment, the reflective portion 160 is disposed between the light emitting layer 132 and the lens member 140.

In this configuration, when light outside of the lens member 140 (hereinafter, referred to as external light Ls) enters the lens member 140, light on a short wavelength side with respect to the wavelength of red, which is the color of the lens member 140, is absorbed by the lens member 140. When light L1 entering from the lens member 140 reaches the reflective portion 160, a part of the light L1 *s* reflected and output rearward from the lens member 140. Therefore, when inside of the vehicle lamp 300 is viewed from outside of the lens member 140, it is possible to form an appearance in which inside of the vehicle lamp 300 is visually recognized as a shape of a mirror surface, that is, an appearance as if a mirror surface is present inside the vehicle lamp 300.

Further, a part of the light L1 passes through the transmissive member 165 and the reflective portion 160, and reaches the light generating portion 130. Light L2 that has reached the light generating portion 130 is scattered by, for example, particles of an inorganic material contained in the light emitting layer 132. The scattered light L3 travels rearward, and a part of the scattered light L3 is reflected by the reflective portion 160, and a part of the scattered light L3 is transmitted and output rearward from the lens member 140. The amount of external light to be output from the lens member 140 is reduced, as compared with a time when the light is incident on the lens member 140 from the outside. Therefore, it is possible to form an appearance in which the light L3 scattered by the light emitting layer 132 cannot be seen from the outside and only a mirror surface can be seen, or an appearance as if the light emitting layer 132 slightly stands out from the mirror surface.

Figure 11:
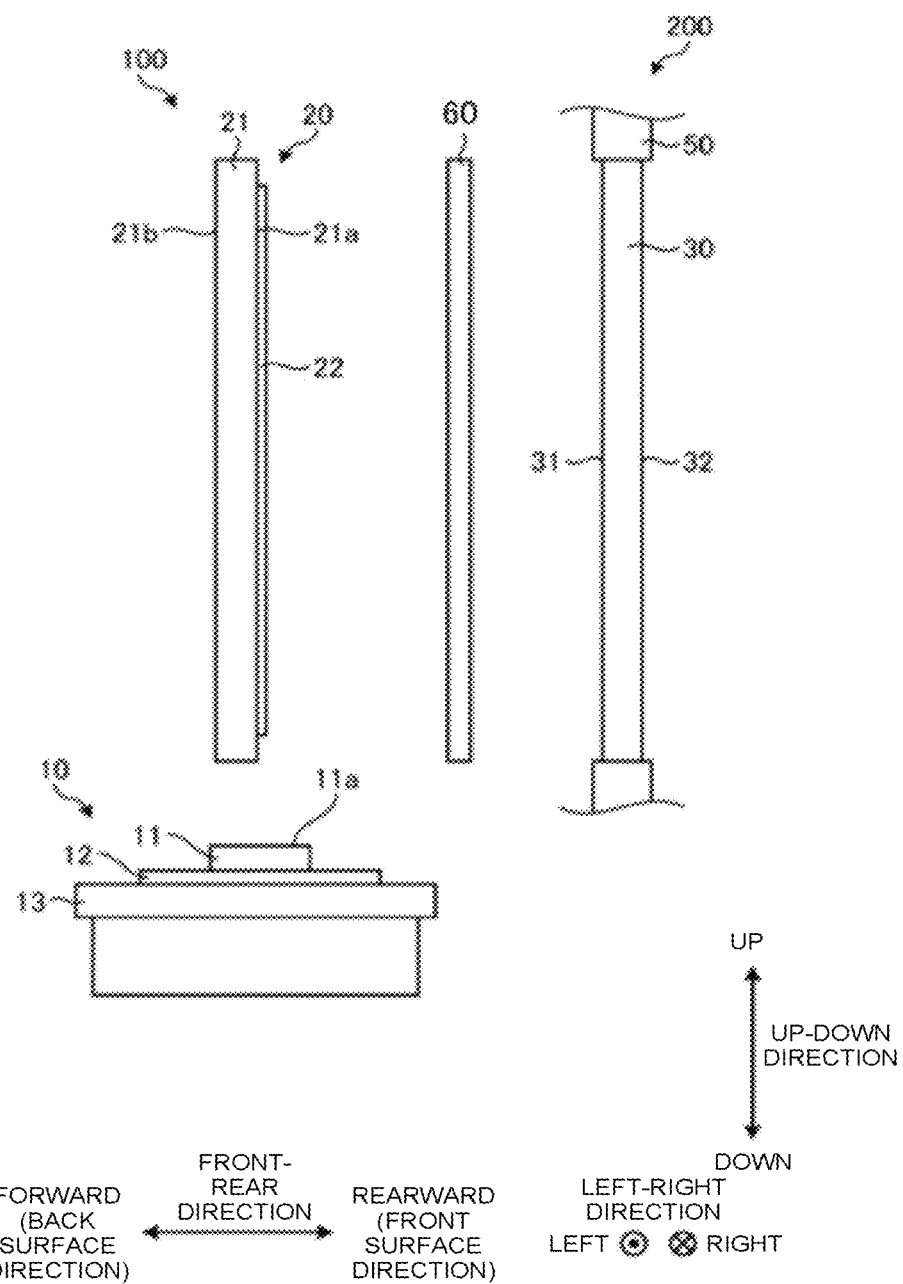
FIG. 11 is a side view illustrating an example of a vehicle lamp according to another embodiment.

FIG. 11 is a side view illustrating an example of a vehicle lamp 200 according to another embodiment. The vehicle lamp 200 illustrated in FIG. 11 is, for example, a signal lamp such as a tail lamp. Therefore, in the present embodiment, the front direction is a rear direction (rearward), and the back surface direction is a front direction (forward). As illustrated in FIG. 11, the vehicle lamp 200 includes a light source unit 100.

The light source unit 100 has a light source portion 10, a light generating portion 20, a lens member 30, and a light absorbing portion 60.

The light absorbing portion 60 is disposed between a light emitting layer 22 and the lens member 30. The light absorbing portion 60 can absorb 1% or more of light entering from outside of the lens member 30. In the present embodiment, a blue filter can be used as the light absorbing portion 60, for example. The light absorbing section 60 is capable of absorbing a red component having the same color as excitation light to be emitted from a light source 11, and associated with generated light.

The light absorbing portion 60 is disposed between the light emitting layer 22 and the lens member 30 separately from the light generating portion 20 and the lens member 30. The light absorbing portion 60 is supported by an unillustrated inner housing or the like. Disposing the light absorbing portion 60 separately from the light generating portion 20 and the lens member 30 enables to securely hold the light absorbing portion 60.

Figure 12:
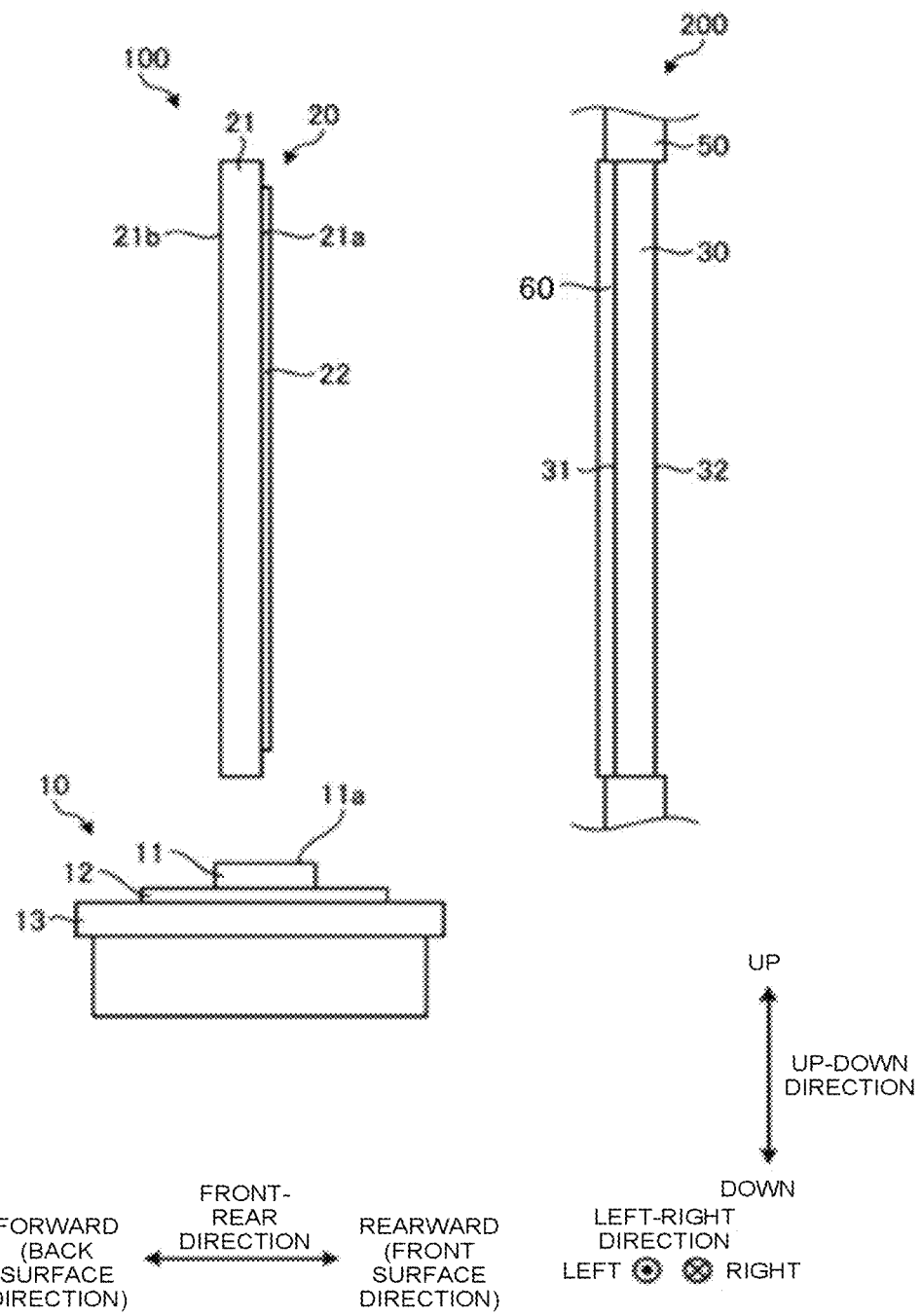
FIG. 12 is a diagram illustrating another example of an arrangement of a light absorbing portion.

FIG. 12 is a diagram illustrating another example of an arrangement of the light absorbing portion 60. As illustrated in FIG. 12, the light absorbing portion 60 can be formed on an inner surface of the lens member 30. Forming the light absorbing portion 60 on the inner surface of the lens member 30 enables to integrally handle the light absorbing portion 60 and the lens member 30.

Figure 13:
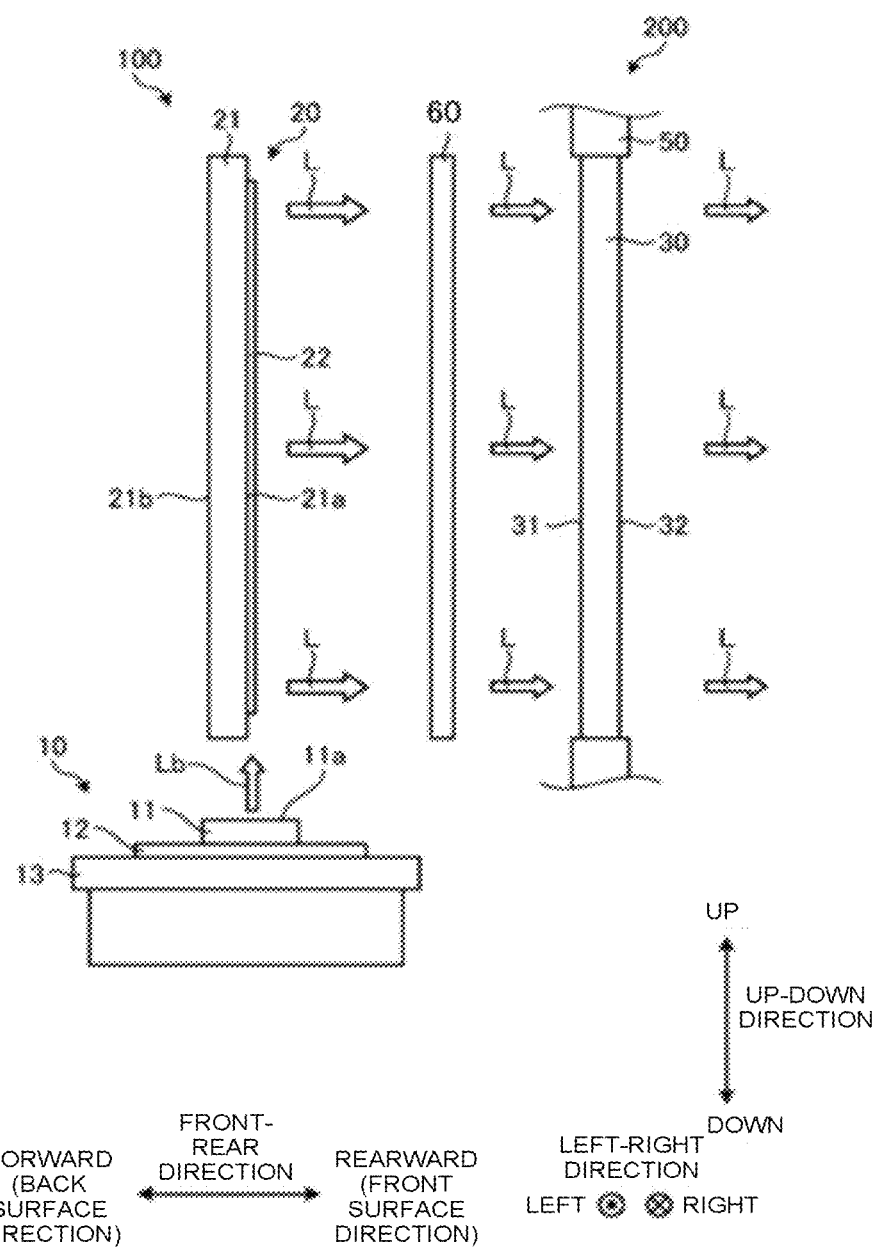
FIG. 13 is a diagram illustrating another example of an operation of the vehicle lamp.
Figure 14:
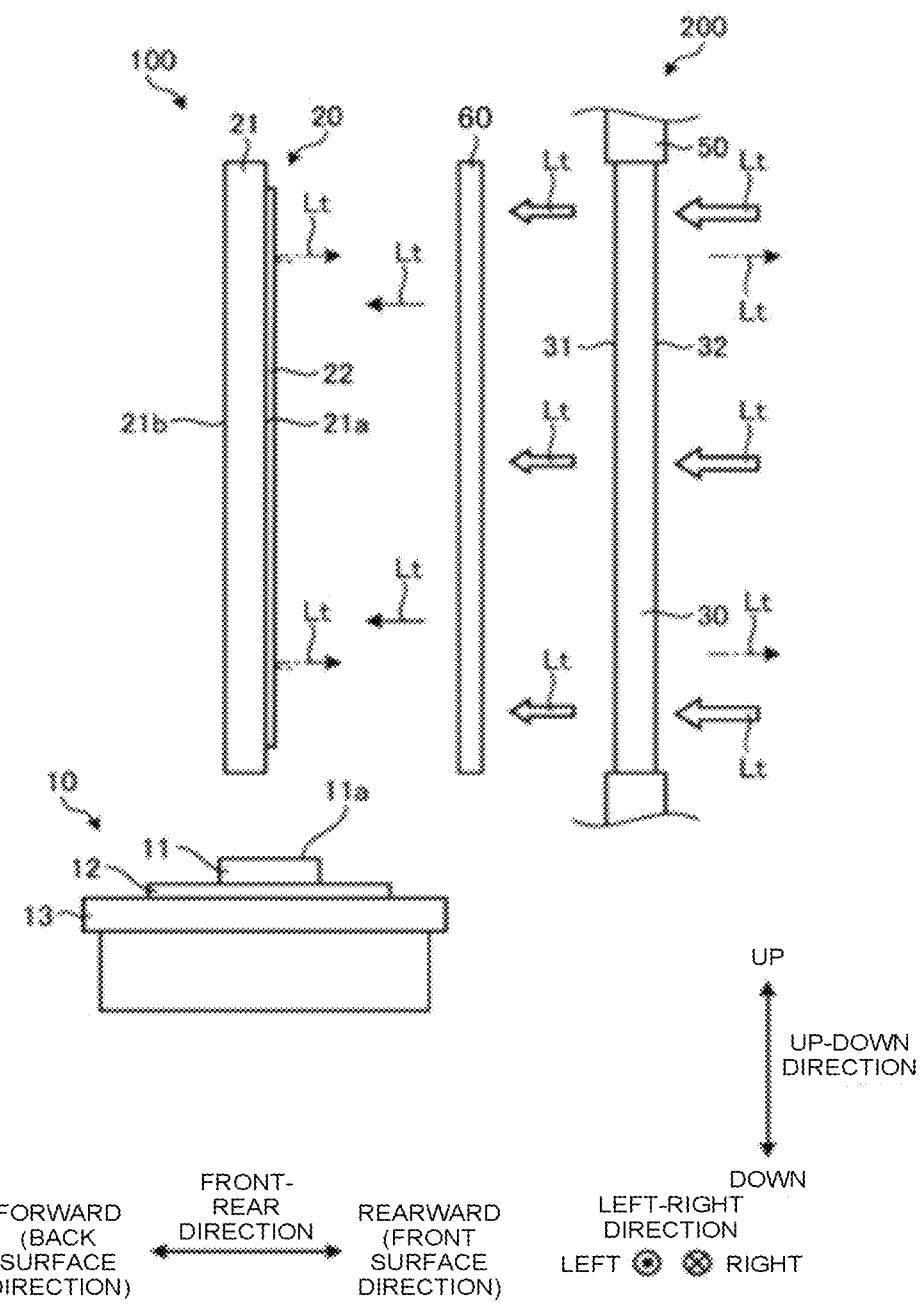
FIG. 14 is a diagram illustrating another example of an operation of the vehicle lamp.

Next, an operation of the vehicle lamp 200 configured as described above is described. FIGS. 13 and 14 are diagrams illustrating an example of an operation of the vehicle lamp 200. As illustrated in FIG. 13, by turning on the light source 11, a part of excitation light Lb to be output from a light emitting surface 11*a* is irradiated on the light emitting layer 22.

When the light emitting layer 22 is irradiated with the excitation light Lb, the light emitting layer 22 is excited and emits red light L. A part of the red light L generated in the light emitting layer 22 is output rearward (in the front direction). Further, when a reflective layer is formed on a planar portion 21*b* of a holding member 21, a part of the red light L generated in the light emitting layer 22 is output forward (in the back surface direction), reflected by the reflective layer, and travels rearward. Therefore, the red light L generated in the light emitting layer 22 is output in the front direction, as planar light. A part of the red light L is absorbed by the light absorbing portion 60, and a part of the red light L is transmitted and incident on an incident surface 31 of the lens member 30. The red light L incident on the incident surface 31 is output in the front direction from an exit surface 32 of the lens member 30, and irradiated as a pattern of a tail lamp, for example.

Further, when the light source 11 is turned off, as illustrated in FIG. 14, since the excitation light Lb is not emitted from the light source 11, the red light L is not generated from the light emitting layer 22. In the present embodiment, the light emitting layer 22 is made of an inorganic material, and contains colored particles in a state that the excitation light Lb is not irradiated. Meanwhile, in the present embodiment, the light absorbing portion 60 is disposed between the light emitting layer 22 and the lens member 30.

In this configuration, when light outside of the lens member 30 (hereinafter, referred to as external light Lt) enters the lens member 30, light on a short wavelength side with respect to the wavelength of red, which is the color of the lens member 30, is absorbed by the lens member 30. When the light reaches the light absorbing portion 60, a part of the light is absorbed by the light absorbing portion 60, and a part of the light passes through the light absorbing portion 60, and reaches the light generating portion 20.

The external light Lt that has reached the light generating portion 20 is scattered by particles of an inorganic material contained in the light emitting layer 22, for example. The scattered external light Lt travels rearward, is partially absorbed by the light absorbing portion 60, and output rearward from the lens member 30. Since most of the external light Lt to be output from the lens member 30 is absorbed by the light absorbing portion 60, the amount of light is reduced, as compared with a time when the external light Lt is incident on the lens member 30. Therefore, when the vehicle lamp 200 is viewed from outside of the lens member 30, it is possible to form an appearance in which the light emitting layer 22 is not visually recognized, that is, an appearance as if the light emitting layer 22 is not present inside the vehicle lamp 200.

As described above, the light source unit 100 according to the present embodiment includes the light generating portion 20 including the light source 11 that emits excitation light, the light emitting layer 22 that is constituted by using an inorganic material and emits generated light by irradiation of the excitation light, and the holding member 21 that holds the light emitting layer 22; the lens member 30 that irradiates the generated light from the light emitting layer 22 in the front direction in a vehicle-mounted state; and the light absorbing portion 60 that is disposed between the light emitting layer 22 and the lens member 30, and absorbs a part of a wavelength component among light from outside of the lens member 30 being associated with the generated light.

According to this configuration, when light outside of the lens member 30 enters the lens member 30, a part of the light is absorbed by the light absorbing portion 60, a part of the light is transmitted through the light absorbing portion 60, and reaches the light generating portion 20. The external light that has reached the light generating portion 20 is scattered by particles of an inorganic material contained in the light emitting layer 22, for example, the scattered light travels rearward, and a part of the scattered light is absorbed by the light absorbing portion 60, and output rearward from the lens member 30. Therefore, when the vehicle lamp 200 is viewed from outside of the lens member 30, it appears as if the light emitting layer 22 is not present inside the vehicle lamp 200. This enables to provide the light source unit 100 having a good appearance.

In the light source unit 100 for a vehicle lamp according to the present embodiment, excitation light is blue, and generated light and the lens member 30 are red. According to this configuration, the excitation light scattered or the like without being absorbed by the light emitting layer 22 can be absorbed by the lens member 30. Therefore, it is possible to suppress the excitation light from leaking to outside of the vehicle lamp 200.

In the light source unit 100 for a vehicle lamp according to the present embodiment, the light absorbing portion 60 may be a blue filter. According to this configuration, it is easy to form a configuration in which excitation light of a red color is absorbed.

In the light source unit 100 for a vehicle lamp according to the present embodiment, the light absorbing portion 60 is provided separately from the light generating portion 20 and the lens member 30. According to this configuration, the degree of freedom of the layout of the light absorbing portion 60 is enhanced.

In the light source unit 100 for a vehicle lamp according to the present embodiment, the light absorbing portion 60 is formed on the lens member 30. According to this configuration, it is possible to integrally handle the light absorbing portion 60 and the lens member 30.

In the light source unit 100 for a vehicle lamp according to the present embodiment, the light absorbing portion 60 is formed in such a way that the light emitting layer 22 is not visually recognized, when inside of the light source unit 100 is viewed from outside of the lens member 30 at a time of turning off the light source 11. According to this configuration, it is possible to provide the light source unit 100 having a good appearance.

The vehicle lamp 200 according to the present embodiment includes the above-described light source unit 100 for a vehicle lamp. According to this configuration, it is possible to provide a vehicle lamp having a good appearance.

FIG. 7 is an exploded perspective view illustrating an example of a vehicle lamp 300 according to another embodiment. FIG. 15 is a side cross-sectional view illustrating an example of the vehicle lamp 300. The vehicle lamp 300 illustrated in FIGS. 7 and 15 is, for example, a signal light such as a tail lamp. Therefore, in the present embodiment, the front direction is a rear direction (rearward), and the back surface direction is a front direction (forward). The vehicle lamp 300 includes a light source portion 110, a reflector 120, a light generating portion 130, a lens member 140, a housing 150, and a light absorbing portion 180.

The light absorbing portion 180 is disposed between a light emitting layer 132 and the lens member 140. The light absorbing portion 180 can absorb 1% or more of light entering from outside of the lens member 140. A blue filter can be used as the light absorbing portion 180, for example. The light absorbing portion 180 is capable of absorbing a red component having the same color as excitation light to be emitted from a light source 111, and associated with generated light.

Figure 16:
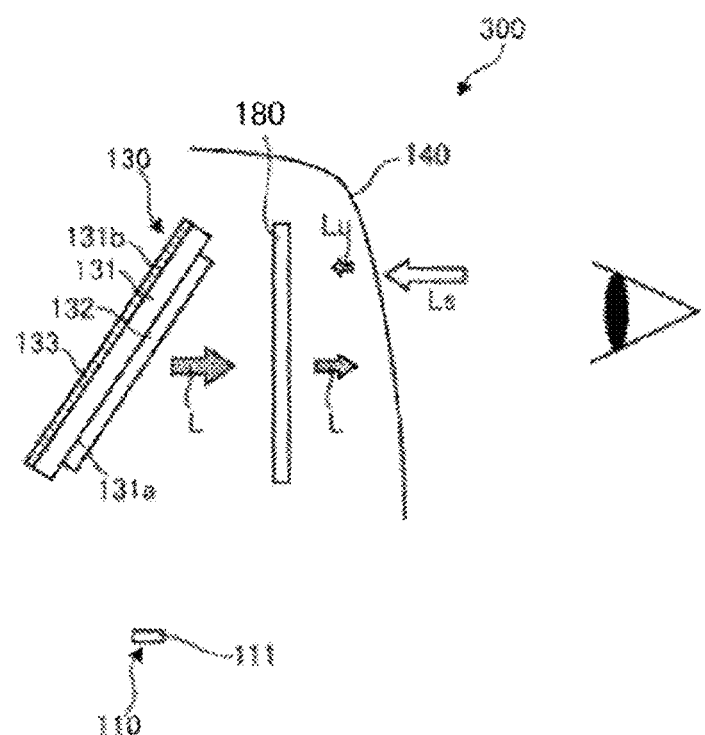
FIG. 16 is a diagram schematically illustrating another example of an operation of the vehicle lamp.

FIG. 16 is a diagram schematically illustrating another example of an operation of the vehicle lamp 300. In FIG. 16, illustration of a configuration of the reflector 120, the housing 150, and the like is omitted. As illustrated in FIG. 16, when a light emitting layer 132 is irradiated with excitation light, the light emitting layer 132 is excited, and emits red light L. The red light L generated in the light emitting layer 132 is output in the front direction, as planar light. A part of the red light L is absorbed by the light absorbing portion 180, and a part of the red light L is transmitted and output from the lens member 140 in the front direction, and irradiated as a pattern of a tail lamp, for example.

In addition, when the light source 111 is turned off, since excitation light is not emitted from the light source 111, the red light L is not generated from the light emitting layer 132. In the present embodiment, the light emitting layer 132 is made of an inorganic material, and contains colored particles in a state that excitation light is not irradiated. In this configuration, when light outside the lens member 140 (hereinafter, referred to as external light Ls) enters the lens member 140, light on a short wavelength side with respect to the wavelength of red, which is the color of the lens member 140, is absorbed by the lens member 140. When light Lu that has entered the lens member 140 reaches the light absorbing portion 180, which is a blue filter, most of the light Lu is absorbed by the light absorbing portion 180. Therefore, when the vehicle lamp 300 is viewed from outside of the lens member 140, it is possible to form an appearance in which the light emitting layer 132 is not visually recognized, that is, an appearance as if the light emitting layer 132 is not present inside the vehicle lamp 300.

Figure 17:
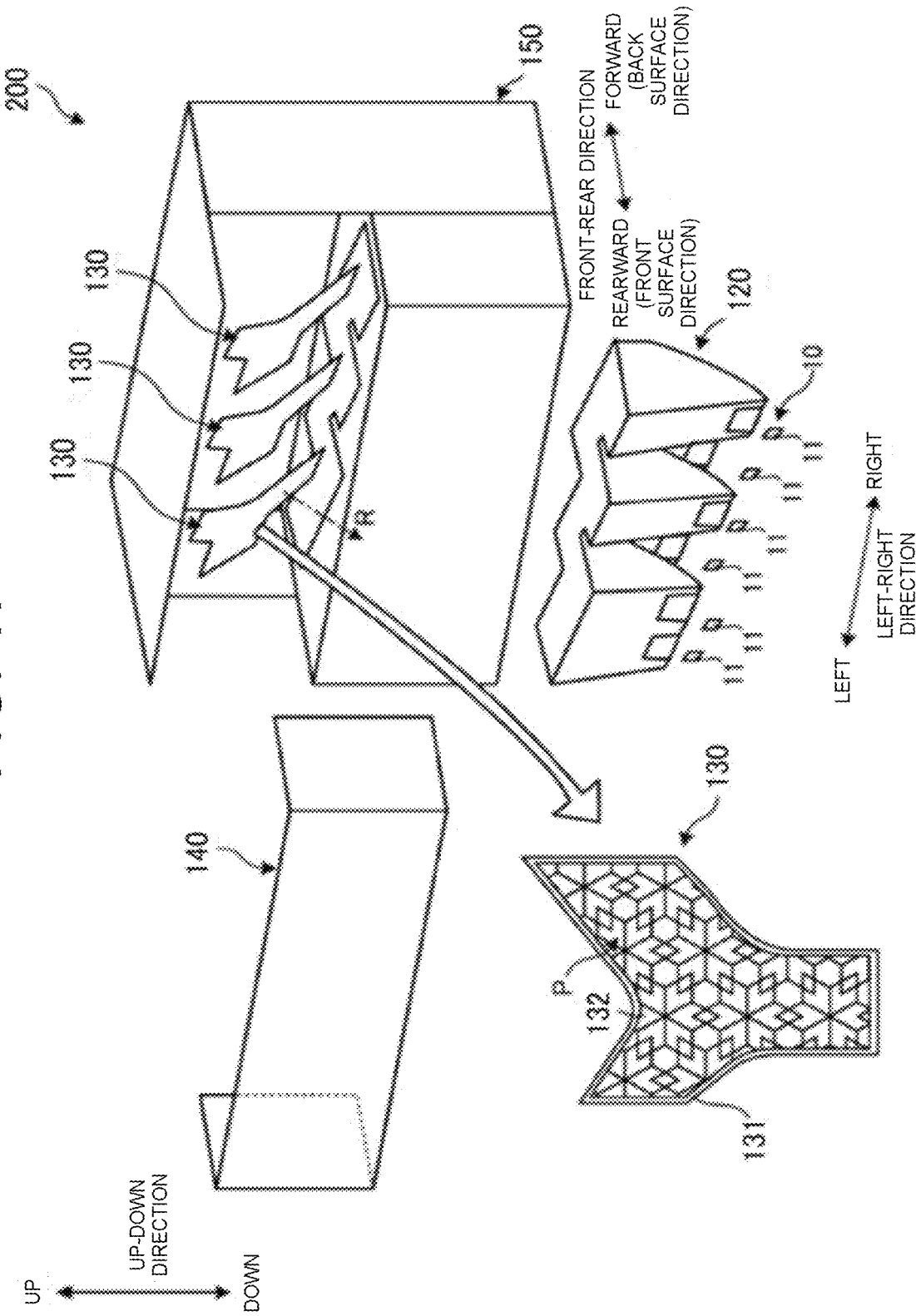
FIG. 17 is an exploded perspective view illustrating an example of a vehicle lamp according to another embodiment.
Figure 18:
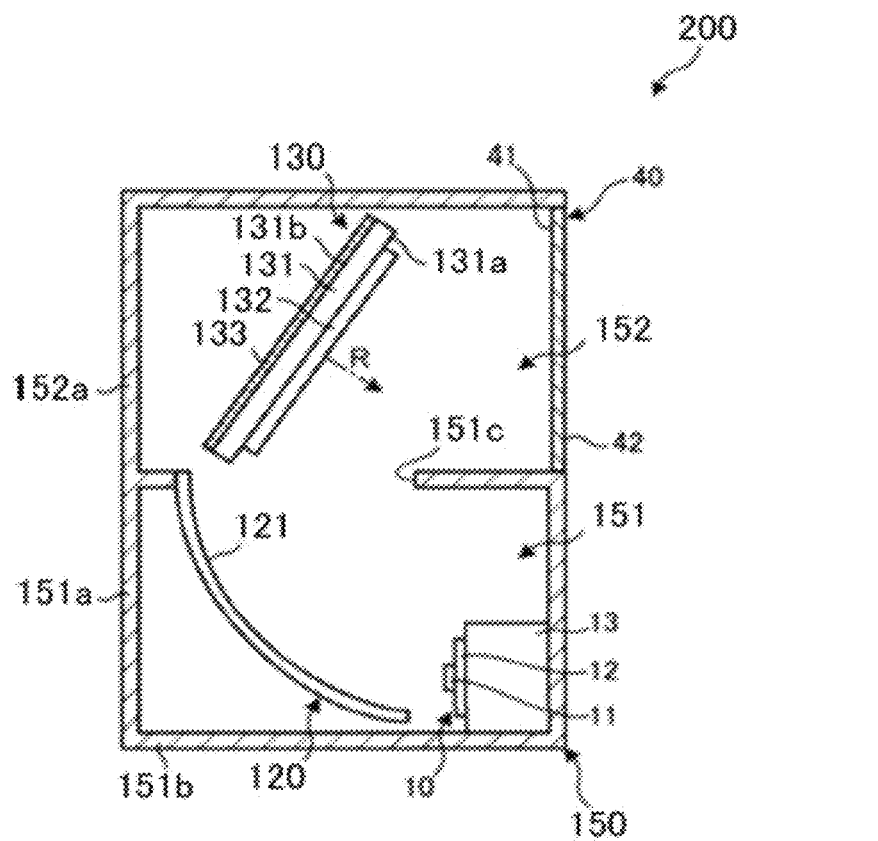
FIG. 18 is a side cross-sectional view illustrating another example of the vehicle lamp.

FIG. 17 is an explosive perspective view illustrating an example of a vehicle lamp 200 according to the present embodiment. FIG. 18 is a side cross-sectional view illustrating an example of the vehicle lamp 200. The vehicle lamp 200 illustrated in FIGS. 17 and 18 is, for example, a signal lamp such as a tail lamp. Therefore, in the present embodiment, the front direction is a rear direction (rearward), and the back surface direction is a front direction (forward). The vehicle lamp 200 includes a light source portion 10, a reflector 120, a light generating portion 130, a lens member 140, and a housing 150.

The light source portion 10 includes a light source 11, a support substrate 12, and a heat sink 13. The light source 11 is a light source such as an LED or an organic EL, for example. The light source 11 is disposed below the light generating portion 130, for example, and a light emitting surface 11a faces in the back surface direction (forward).

The light source 11 emits blue light from the light emitting surface 11a, as excitation light, for example. Note that, the light source 11 is not limited to a light source that emits blue light, and it is possible to use a light source capable of irradiating light (such as purple light, or ultraviolet light) of a short wavelength, as compared with a wavelength of generated light generated in the light generating portion 130 to be described later. The light source 11 is provided by the number corresponding to the number of the light generating portions 130 to be described later.

The support substrate 12 supports the light source 11. The support substrate 12 is supported by the housing 150.

The reflector 120 is disposed on the back side with respect to the light source 11. The reflector 120 includes a reflective surface 121 that reflects excitation light to be emitted from the light source 11 upward. The reflective surface 121 is provided for each of the light generating portions 130 to be described later. Note that, the reflective surface 121 may be disposed as necessary irrespective of the number and the location of the light generating portions 130. The reflector 120 is disposed inside the housing 150. The reflector 120 is disposed in such a way as to hide on the back side of the housing 150 so as not to be directly seen, when the vehicle lamp 200 is viewed from the front side.

The light generating portion 130 includes a holding member 131 and a light emitting layer 132. The light generating portion 130 is disposed in such a way that the normal direction R of the light emitting layer 132 is inclined obliquely downward with respect to the front direction. In addition, the light generating portion 130 is disposed in such a way that the normal direction R of the light emitting layer 132 faces the vehicle outer side (left side) with respect to the front direction. A plurality of the light generating portions 130 are arranged in the left-right direction.

The holding member 131 is capable of transmitting excitation light to be emitted from the light source 11. The holding member 131 is able to guide the excitation light into the holding member 131 by transmitting the excitation light, and irradiate the light over the entire surface of the light emitting layer 132 to be described later. In the present embodiment, the holding member 131 has a rectangular plate shape, for example, and is capable of transmitting generated light emitted by the light emitting layer 132 to be described later. For example, glass or the like is used as the holding member 131 as described above.

The light emitting layer 132 is held on a first surface 131*a* of the holding member 131. The light emitting layer 132 emits generated light by exciting excitation light from the light source 11 by irradiation. The light emitting layer 132 is held on the first surface 131*a* of the holding member 131, for example. The light emitting layer 132 is formed into a shape associated with a shape of a tail lamp in a front view, or the like, for example. For example, as illustrated in FIG. 17, the light emitting layer 132 may have a predetermined pattern P.

In the present embodiment, as the light emitting layer 132, for example, an organic material obtained by doping about 5% of a guest material such as acetylacetone into a host material such as polyvinyl carbazole is used. In this case, the light emitting layer 132 emits red light, as generated light. The combination of the host material and the guest material is not limited to the above.

When the light emitting layer 132 is made of an organic material, for example, the light emitting layer 132 can be formed by co-depositing a host material and a guest material on the holding member 131. Alternatively, the light emitting layer 132 may be formed by a wet method such as a spin coating method or a spray method. When an organic material is used as the light emitting layer 132, a substrate made of glass or the like can be used as the holding member 131.

Further, an inorganic material such as CaAlSiN3:Eu (CASN) may be used as the light emitting layer 132. In this case, the light emitting layer 132 can be formed by applying, on the holding member 131, a mixed material of a transparent resin such as silicone, and CASN, and baking.

Further, the light emitting layer 132 can be formed by applying, on the holding member 131, a mixed material of an inorganic material such as low melting point glass, and CASN, and baking.

When an inorganic material is used as the light emitting layer 132, a substrate made of glass or the like can be used as the holding member 131. Further, other types of materials such as (Sr, Ca)AlSiN3:Eu (SCASN) may be used as the light emitting layer 132, for example.

The lens member 140 is disposed in the front direction with respect to the light generating portion 130. The lens member 140 includes an incident surface 141 and an exit surface 142. Red light, which is generated light from the light generating portion 130, is incident on the incident surface 141. The exit surface 142 outputs light incident on the incidence surface 141 in the front direction. The lens member 140 transmits red light and absorbs light different from red light. Therefore, an excitation light component included in external light is absorbed by the lens member 140. The lens member 140 is held by the housing 150 or the like, for example.

The housing 150 is formed by using a resin material of a black color or the like, for example. The housing 150 has a rectangular box shape, for example. The housing 150 supports or accommodates the light source portion 10, the reflector 120, the light generating portion 130, and the lens member 140. The housing 150 includes an accommodation portion 151 and a lamp chamber 152.

The accommodation portion 151 and the lamp chamber 152 are formed in two stages in the up-down direction. The lamp chamber 152 is arranged on the upper stage side, and the accommodation portion 151 is arranged on the lower stage side. The accommodation portion 151 accommodates the light source portion 10 and the reflector 120. The accommodation portion 151 is surrounded by a lower wall portion 151*a* in the front-rear direction and the left-right direction. The lower wall portion 151*a* is disposed in such a way as to cover the reflector 120, when the vehicle lamp 200 is viewed from the front side. The accommodation portion 151 has a bottom portion 151*b* at a lower portion thereof. The accommodation portion 151 has an opening portion 151*c* in an upper portion thereof. The opening portion 151*c* has a shape associated with the shape of an upper portion of the reflector 120. The lamp chamber 152 is provided in a space surrounded by an upper wall portion 152*a* and the lens member 140. The light generating portion 130 is disposed in the lamp chamber 152.

Figure 20:
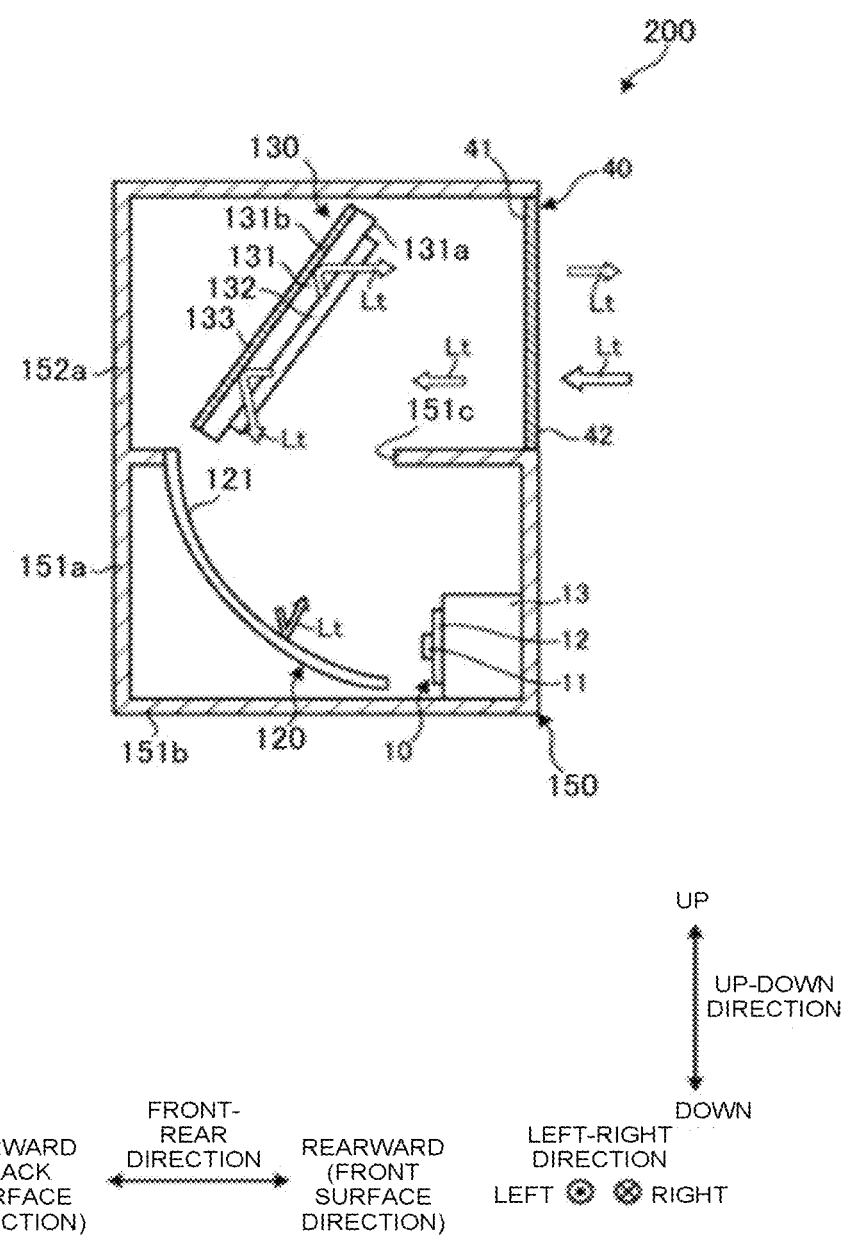
FIG. 20 is a diagram illustrating another example of an operation of the vehicle lamp.

Next, an operation of the vehicle lamp 200 configured as described above is described. FIGS. 19 to 21 are diagrams illustrating an example of an operation of the vehicle lamp 200. As illustrated in FIG. 19, by turning on the light source 11, a part of excitation light Lb to be output from the light emitting surface 11*a* is irradiated to the light emitting layer 132 directly or by transmitting through the holding member 131.

When the light emitting layer 132 is irradiated with the excitation light Lb, the light emitting layer 132 is excited, and emits red light L. A part of the red light L generated in the light emitting layer 132 is output rearward (in the front direction). In addition, when a reflective layer is formed on a second surface 131*b* of the holding member 131, a part of the red light L generated in the light emitting layer 132 is output forward (in the back surface direction), reflected by the reflective layer, and travels rearward. Therefore, the red light L generated in the light emitting layer 132 is output in the front direction, as planar light. The red light L is incident on the incident surface 141 of the lens member 140, output from the exit surface 142 in the front direction, and irradiated as a pattern of a tail lamp, for example.

When the light source 11 is turned off, since the excitation light Lb is not emitted from the light source 11, the red light L is not generated from the light emitting layer 132. FIG. 20 illustrates an example in which the light emitting layer 132 is formed by using an organic material.

As illustrated in FIG. 20, in a configuration in which the light emitting layer 132 is made of an organic material, when light outside of the lens member 140 (hereinafter, referred to as external light Lt) enters the lens member 140, light on a short wavelength side with respect to the wavelength of red, which is the color of the lens member 140, is absorbed by the lens member 140. When the external light Lt reaches the light generating portion 130, the external light Lt is reflected by a light reflective member 133 on the second surface 131b, and reaches the reflector 120. The external light Lt that has reached the reflector 120 is reflected by the reflector 120, returns to the light generating portion 130, is reflected by the light reflective member 133 of the light generating portion 130, and output from the lens member 140 toward the front side.

Therefore, when inside of the vehicle lamp 200 is viewed from outside of the lens member 140 in a state that the light source 11 is turned off, it is possible to form an appearance in which inside of the vehicle lamp 200 is visually recognized as a shape of a mirror surface, that is, an appearance as if a mirror surface is present inside the vehicle lamp 200.

FIG. 21 illustrates an example in which the light emitting layer 132 is formed by using an inorganic material. As illustrated in FIG. 21, in a configuration in which the light emitting layer 132 is made of an inorganic material, the light emitting layer 132 contains colored particles in a state that the excitation light Lb is not irradiated.

In this configuration, when light outside of the lens member 140 (hereinafter, referred to as external light Lt) enters the lens member 140, light on a short wavelength side with respect to the wavelength of red, which is the color of the lens member 140, is absorbed by the lens member 140. When the external light Lt reaches the light generating portion 130, the external light Lt is scattered by particles of an inorganic material contained in the light emitting layer 132, for example. The scattered external light Lt travels rearward, and is output rearward from the lens member 140.

Therefore, when inside of the vehicle lamp 200 is viewed from outside of the lens member 140 in a state that the light source 11 is turned off, it is possible to form an appearance in which inside of the vehicle lamp 200 is visually recognized in a state that the light emitting layer 132 looks dark, as compared with a time when the light source 11 is turned on. Note that, an absorbing member that absorbs red light, as exemplified by a blue transparent substrate or the like may be disposed between the light emitting layer 132 and the lens member 140. This enables to absorb a part of the external light Lt scattered on the light emitting layer 132. In this configuration, when inside of the vehicle lamp 200 is viewed from outside of the lens member 140 in a state that the light source 11 is turned off, it is possible to form an appearance as if the light emitting layer 132 cannot be seen inside the vehicle lamp 200.

As described above, the vehicle lamp 200 according to the present embodiment includes the light generating portion 130 including the light source 11 that emits excitation light, the reflector 120 that reflects the excitation light from the light source 11, and the light emitting layer 132 that emits generated light by irradiation of the excitation light and the holding member 131 that holds the light emitting layer 132; and the lens member 140 that is disposed on the front side with respect to the light emitting layer 132, and irradiates the generated light from the light emitting layer 132 in the front direction in a vehicle-mounted state.

According to this configuration, the light source 11 emits excitation light, the reflector 120 reflects the light, the light emitting layer 132 outputs generated light by receiving irradiation of the excitation light, and the lens member 140 is disposed on the front side with respect to the light emitting layer 132 and irradiates the generated light from the light emitting layer 132 in the front direction in a vehicle-mounted state. Therefore, it is possible to arrange the light source 11, the reflector 120, the light generating portion 130, and the lens member 140 in the front-back direction in a compact manner. This enables to provide the vehicle lamp 200 capable of arranging each part in a compact manner.

In the vehicle lamp 200 according to the present embodiment, the light generating portion 130 is disposed in such a way that a normal direction of the light emitting layer 132 is inclined obliquely downward with respect to the front direction. According to this configuration, since the area of the light emitting layer 132 when viewed from below is increased, the light emitting layer 132 can easily receive irradiation of excitation light from below. This enables to generate generated light efficiently.

In the vehicle lamp 200 according to the present embodiment, excitation light is blue, and generated light and the lens member 140 are red. According to this configuration, excitation light scattered or the like without being absorbed by the light emitting layer 132 can be absorbed by the lens member 140. Therefore, it is possible to suppress the excitation light from leaking to outside of the vehicle lamp 200.

In the vehicle lamp 200 according to the present embodiment, a plurality of the light generating portions 130 are arranged in the left-right direction in a vehicle-mounted state. According to this configuration, a plurality of patterns of the light emitting layer 132 can be seen in the left-right direction, when the vehicle lamp 200 is viewed from the front side. This enables to provide the vehicle lamp 200 having a good appearance.

The vehicle lamp 200 according to the present embodiment further includes the housing 150 that supports the light source 11, the reflector 120, the light generating portion 130, and the lens member 140. The housing 150 is disposed in such a way as to cover the reflector 120 when viewed from the front side, and defines a lamp chamber between the lens member 140 and itself. The light generating portion 130 is disposed inside the lamp chamber. According to this configuration, a state in which the reflector 120 is hidden by the housing 150 and cannot be seen when viewed from the front side is achieved. This enables to provide the vehicle lamp 200 having a good appearance.

In the vehicle lamp 200 according to the present embodiment, the holding member 131 includes the light reflective member 133 that is formed into a plate-like shape, is capable of transmitting excitation light and generated light, and reflects the excitation light and the generated light on a second surface opposite to a first surface on which the light emitting layer 132 is held. According to this configuration, it is possible to reflect excitation light that transmits through the holding member 131 among excitation light to be irradiated on the light generating portion 130 inward, and allow the light to reach the light emitting layer 132. Further, it is possible to reflect generated light generated in the light emitting layer 132 and irradiated toward the back side inward toward the front side.

The technical scope of the present invention is not limited to the above embodiments, and changes may be made as appropriate within a range not departing from the gist of the present invention.

Figure 22:
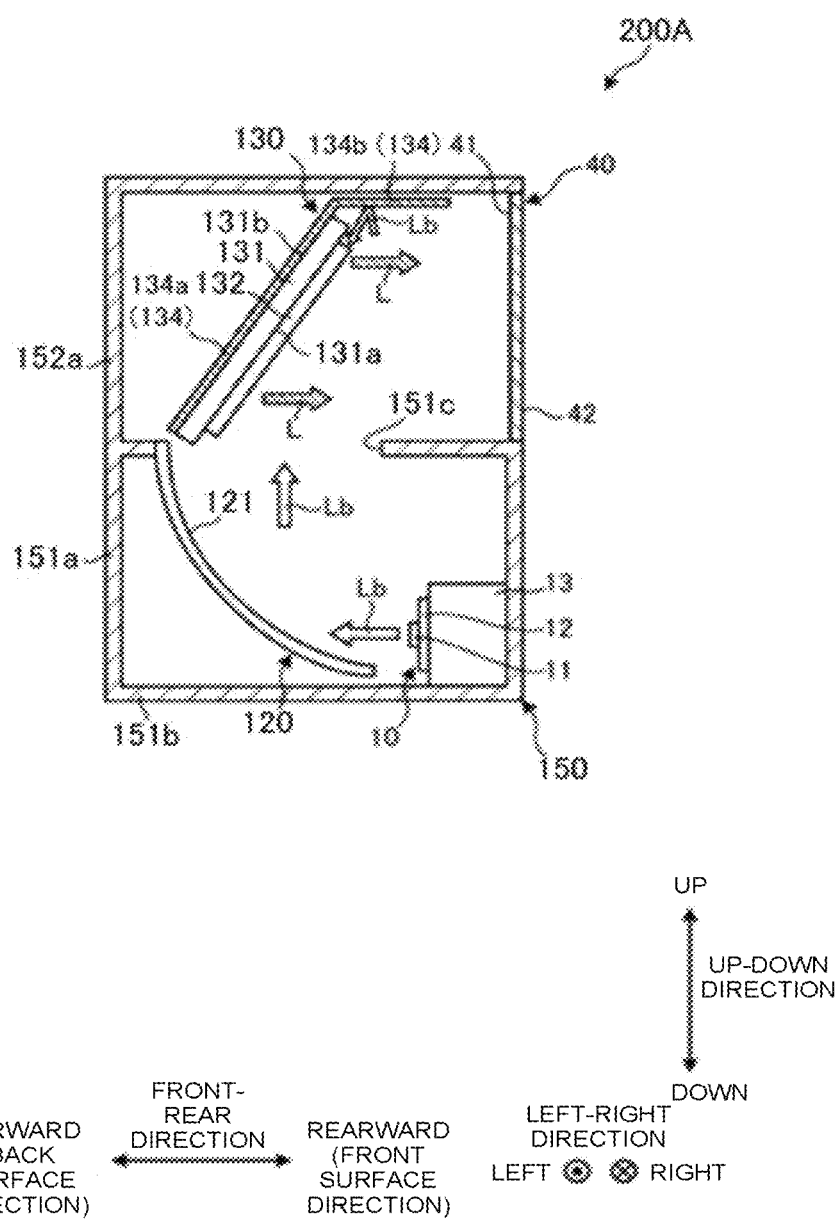
FIG. 22 is a side cross-sectional view illustrating another example of a vehicle lamp according to another embodiment.

FIG. 22 is a side cross-sectional view illustrating another example of a vehicle lamp according to another embodiment. As illustrated in FIG. 22, in a vehicle lamp 200A, a light reflective member 134 may be a plate-like member including a cover portion 134a that covers a second surface 131b, and a bulging portion 134b bulging upward from the second surface 131b. The bulging portion 134b is bent toward the front side. The bulging portion 134b is disposed in such a way as to protrude toward the front side with respect to a light emitting layer 132.

As described above, in the vehicle lamp 200A, the light reflective member 134 includes the cover portion 134a that covers the second surface 131b, and the bulging portion 134b bulging upward from the second surface 131b. The bulging portion 134b is bent toward the front side, and protrudes in the front direction with respect to the light emitting layer 132. According to this configuration, excitation light Lb that has passed through the light emitting layer 132 upward from a light source 11 can be reflected downward, and reach the light emitting layer 132. Therefore, generated light L can be efficiently generated in the light emitting layer 132.

Figure 23:
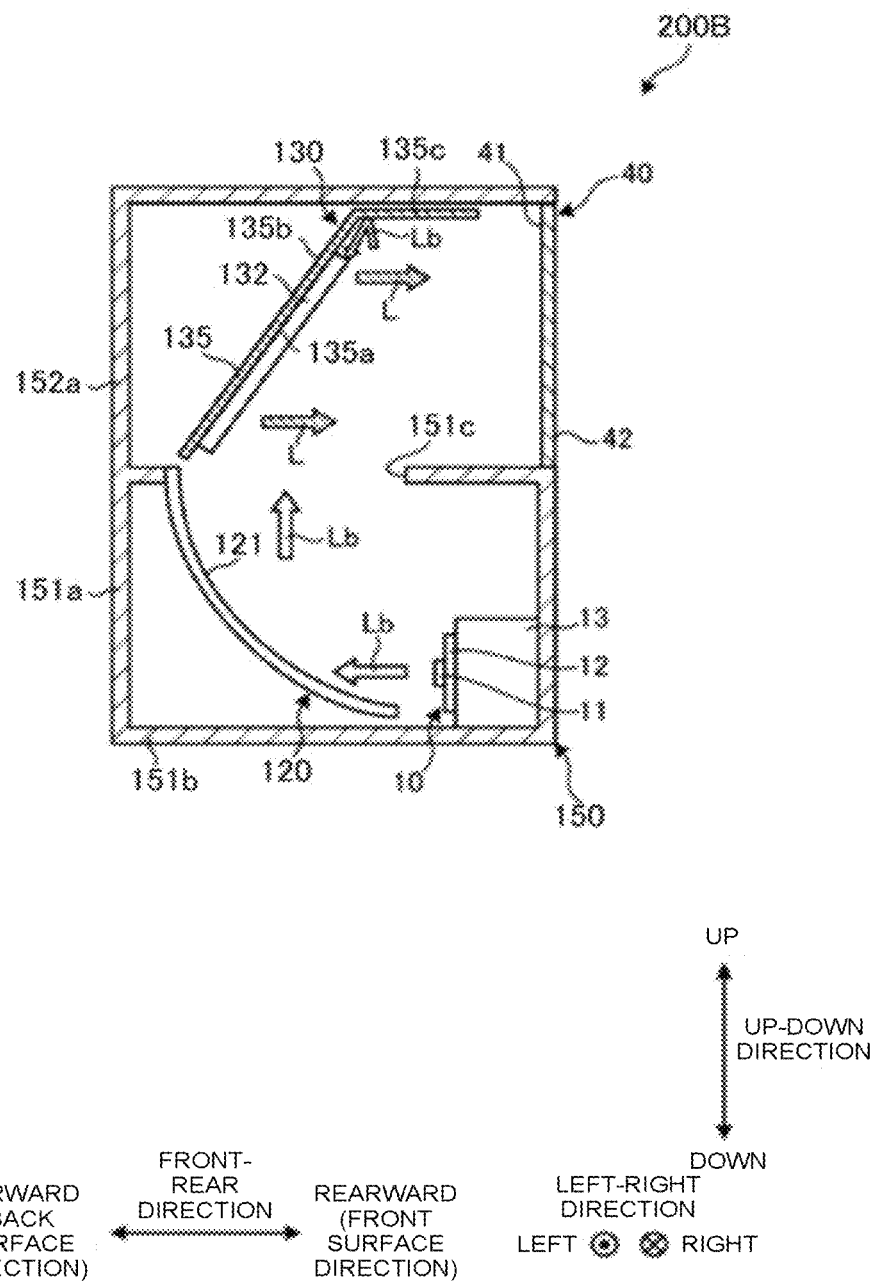
FIG. 23 is a side cross-sectional view illustrating another example of a vehicle lamp according to another embodiment.

FIG. 23 is a side cross-sectional view illustrating another example of a vehicle lamp according to another embodiment. As illustrated in FIG. 23, in a vehicle lamp 200B, a first surface 135a of a holding member 135 may be a light reflective surface that reflects excitation light and generated light, and a light emitting layer 132 may be formed on the first surface 135a, which is a light reflective surface. Further, the holding member 135 may include a protruding portion 135b bulging upward of the light emitting layer 132, and protruding toward the front side of the light emitting layer 132.

As described above, in the vehicle lamp 200B, the holding member 135 has a plate-like shape, and includes the first surface 135a that reflects excitation light and generated light. The light emitting layer 132 is formed on the first surface 135a. The holding member 135 includes the protruding portion 135b bulging upward of the light emitting layer 132 and protruding toward the front side of the light emitting layer 132. According to this configuration, excitation light Lb that has passed through the light emitting layer 132 upward from a light source 11 can be reflected downward, and reach the light emitting layer 132. Therefore, generated light L can be efficiently generated in the light emitting layer 132. Further, as compared with the configuration illustrated in FIG. 22, the number of parts can be reduced.

The technical scope of the present invention is not limited to the above embodiments, and changes may be made as appropriate within a range not departing from the gist of the present invention.

DESCRIPTION OF REFERENCE NUMERALS

L . . . Red light
Lb . . . Excitation light
Lt . . . External light
P . . . Pattern
R . . . Normal direction
10, 110 . . . Light source portion
11, 111 . . . Light source
11a . . . Light emitting surface
12, 112 . . . Support substrate
13 . . . Heat sink
20, 130 . . . Light generating portion
21, 131, 135 . . . Holding member
21a, 21b . . . Planar portion
22, 132 . . . Light emitting layer
30, 140 . . . Lens member
31, 141 . . . Incident surface
32, 142 . . . Exit surface
40, 160 . . . Reflective portion
45, 165 . . . Transmissive member
50 . . . Inner panel
60, 180 . . . Light absorbing portion
100 . . . Light source unit
120 . . . Reflector
121 . . . Reflective surface
131a, 135a . . . First surface
131b . . . Second surface
133, 134 . . . Light reflective member
134a . . . Cover portion
134b . . . Bulging portion
135b . . . Protruding portion
150 . . . Housing
151 . . . Accommodation portion
151a . . . Lower wall portion
151b . . . Bottom portion
151c . . . Opening portion
152 . . . Lamp chamber
152a . . . Upper wall portion
200, 200A, 200B, 300 . . . Vehicle lamp

The invention claimed is:

1. A light source unit for a vehicle lamp comprising:
a light generating portion including
  a light source that emits excitation light,
  a light emitting layer that is constituted by using an inorganic material, and emits generated light by irradiation of the excitation light, and
  a holding member that holds the light emitting layer;
a lens member that irradiates the generated light from the light emitting layer in a front direction in a vehicle-mounted state; and
a single reflective portion that is disposed between the light emitting layer and the lens member, and is capable of transmitting the generated light generated in the light emitting layer,
wherein when the light source is turned off, the lens member reflects a part of light from outside of the lens member.

2. The light source unit for a vehicle lamp according to claim 1, wherein
the reflective portion is formed by using a metal vapor deposition film.

3. The light source unit for a vehicle lamp according to claim 1, wherein
the excitation light is blue, and
the generated light and the lens member are red.

4. The light source unit for a vehicle lamp according to claim 1, wherein
the reflective portion has a reflectance that reflects 10% or more but less than 100% of the light that reaches the reflective portion, so that the reflective portion is visually recognized as a mirror surface, when inside of the lens member is viewed from outside of the lens member.

5. The light source unit for a vehicle lamp according to claim 1, wherein
the holding member is capable of transmitting the generated light,
the light generating portion is formed on a first surface of the holding member, and
the reflective portion is formed on a second surface opposite to the first surface of the holding member.

6. The light source unit for a vehicle lamp according to claim 1, further comprising
a transmissive member that transmits the generated light generated by the light generating portion, between the light emitting layer and the lens member, wherein
the reflective portion is provided on the transmissive member.

7. A light source unit for a vehicle lamp comprising:
a light generating portion including
a light source that emits excitation light,
a light emitting layer that is constituted by using an inorganic material, and emits generated light by irradiation of the excitation light, and
a holding member that holds the light emitting layer;
a lens member that irradiates the generated light from the light emitting layer in a front direction in a vehicle-mounted state; and
a reflective portion that is disposed between the light emitting layer and the lens member, is capable of reflecting a part of light from outside of the lens member, and is capable of transmitting the generated light generated in the light emitting layer,
wherein the reflective portion is formed on the lens member.

8. A light source unit for a vehicle lamp comprising:
a light generating portion including
a light source that emits excitation light,
a light emitting layer that is constituted by using an inorganic material, and emits generated light by irradiation of the excitation light, and
a holding member that holds the light emitting layer;
a lens member that irradiates the generated light from the light emitting layer in a front direction in a vehicle-mounted state; and
a light absorbing portion that is disposed between the light emitting layer and the lens member, and absorbs a part of a wavelength component among light from outside of the lens member being associated with the generated light.

9. The light source unit for a vehicle lamp according to claim 8, wherein
the excitation light is blue, and
the generated light and the lens member are red.

10. The light source unit for a vehicle lamp according to claim 9, wherein
the light absorbing portion is a blue filter.

11. The light source unit for a vehicle lamp according to claim 10, wherein
the light absorbing portion is provided separately from the light generating portion and the lens member.

12. The light source unit for a vehicle lamp according to claim 8, wherein
the light absorbing portion is formed on the lens member.

13. The light source unit for a vehicle lamp according to claim 8, wherein
the light absorbing portion is formed in such a way that the light emitting layer is not visually recognized, when inside of the light source unit is viewed from outside of the lens member at a time of turning off of the light source.

* * * * *